(12) United States Patent
Kiss et al.

(10) Patent No.: US 7,745,552 B2
(45) Date of Patent: Jun. 29, 2010

(54) FOULING PREVENTION IN POLYMERIZATION REACTORS

(75) Inventors: Gabor Kiss, Hampton, NJ (US); Robert P. Reynolds, Jr., Clinton, NJ (US); Charles K. Morgan, Erwinna, PA (US); John W. Chu, Neshanic Station, NJ (US); Megan Meier, Houston, TX (US)

(73) Assignee: Exxonmobil Research and Engineering Company, Annandale, NJ (US)

( * ) Notice: Subject to any disclaimer, the term of this patent is extended or adjusted under 35 U.S.C. 154(b) by 124 days.

(21) Appl. No.: 12/157,972

(22) Filed: Jun. 13, 2008

(65) Prior Publication Data

US 2009/0005520 A1  Jan. 1, 2009

Related U.S. Application Data (60) Provisional application No. 60/937,929, filed on Jun. 29, 2007.

(51) Int. Cl.
C08F 2/00 (2006.01)
B01J 19/18 (2006.01)

(52) U.S. Cl. .............. 526/88; 526/64; 526/65; 526/918; 422/135

(58) Field of Classification Search .......... 526/64, 526/65, 73, 918, 88; 422/132, 135
See application file for complete search history.

(56) References Cited

U.S. PATENT DOCUMENTS 3,451,785 A * 6/1969 Rohlfing et al. ............. 422/113
3,737,288 A * 6/1973 Hochman ................... 422/135
6,969,490 B2 11/2005 Marx et al.
7,022,780 B2 4/2006 Marx et al.
2006/0025545 A1 2/2006 Brant et al.
2006/0211832 A1 9/2006 Brant et al.

FOREIGN PATENT DOCUMENTS

DE          300291       9/1917
WO       WO 93/11171   * 6/1993
WO      WO 2006/044149   4/2006

OTHER PUBLICATIONS

"Operation of the Reactor with a Sealed Electric Motor in Manufacture of Ditolyethane".

* cited by examiner

*Primary Examiner*—Fred M Teskin
(74) *Attorney, Agent, or Firm*—Robert A. Migliorin (57) ABSTRACT

Reactor designs and processes for operating such reactor designs to minimize or eliminate fouling in homogeneous polymerization processes (solution and supercritical). The process includes providing a reactor with one or more feed entry ports, wherein the reactor feed components are fed through each of the one or more feed entry ports at a linear velocity of greater than or equal to 0.3 m/min. The one or more feed entry ports may also be optionally extended beyond the interior reactor wall by greater than or equal to 2% of the internal radius of the reactor to further decrease the propensity for fouling. A stirred reactor may also include a stirrer feed port for purging the stirrer with a stirrer purge stream at a linear velocity of greater than or equal to 0.3 m/min to decrease stirrer fouling.

56 Claims, 2 Drawing Sheets

FOULING PREVENTION IN POLYMERIZATION REACTORS

CROSS-REFERENCE TO RELATED APPLICATIONS

This Application claims the benefit of U.S. Provisional Application No. 60/937,929 filed on Jun. 29, 2007, which is herein incorporated by reference.

BACKGROUND

1. Field

The present disclosure relates to the field of olefin polymerization. It more particularly relates to methods and designs of preventing fouling in olefin polymerization reactors. Still more particularly, the present disclosure relates to methods and designs of preventing fouling in olefin polymerization reactors when the reactor is operating in supercritical or liquid-filled solution polymerization modes.

2. Description of the Related Art

International Patent Publication No. WO 2006/044149, herein incorporated by reference in its entirety, discloses a polymerization process where the polymer dissolution is substantially aided by an inert solvent (also referred to herein as "solution process"), such as where the polymerization medium contains more than 20 wt % solvent, and typically more than 60 wt % solvent. When the reactor pressure in a solution polymerization process is above the bubble point pressure of the liquid polymerization system, the entire reactor is filled with liquid without a vapor phase being present. Such operation mode of a solution polymerization process will be referred to herein as liquid-filled reactor operation. Commercial solution polymerization reactors often operate in this liquid-filled operation regime for maximum utilization of the entire reactor volume.

U.S. Patent Publication Nos. 2006-0211832 and 2006-0025545, herein incorporated by reference in their entirety, disclose a flexible homogeneous polymerization platform for the homogeneous supercritical polymerization of propylene-containing monomer feeds (also referred to herein as the "supercritical process", or "supercritical polymerization", or "supercritical polymerization process", or "supercritical propylene polymerization"). In the referred supercritical polymerization process, polymerization is often carried out in a substantially bulk supercritical monomer medium, thus it is a bulk homogeneous supercritical polymerization process. The polymeric products in these supercritical processes are in a homogeneously dissolved state in the reactor. Since supercritical fluids completely fill the volume available to them, the reactors of said supercritical polymerization processes are also completely filled with the supercritical fluid polymerization system, and thus in this regard are similar to the liquid-filled solution polymerization process. However, the supercritical polymerization processes provide an advantageous means to the so-called solution processes in their ability to flexibly and robustly both produce highly crystalline, high molecular weight (i.e. low melt-flow rate) isotactic propylene homopolymers and low-crystallinity and/or low molecular weight homo- and copolymers.

Both solution and homogeneous supercritical polymerization processes may be performed in a bulk monomer phase using essentially pure monomer(s) as solvent or may keep the polymer in the homogeneous fluid state by employing an inert solvent in substantial concentrations (i.e., 40 wt % or more or 60 wt % or more). The solution process provides for a polymer-containing liquid phase either in an inert solvent or in the essentially neat monomer or in their mixture in their liquid state. The homogeneous supercritical process provides for the polymeric fluid state by dissolving the polymeric product either in an inert solvent or in the essentially neat monomer or in their mixture in their supercritical state. When solution polymerization is performed in the liquid-filled mode, i.e., at reactor pressures above the bubble point of the liquid-phase polymerization system, it shares a common characteristics with the supercritical polymerization process in that the polymerization system in both processes fills the entire reactor volume. An important consequence of this feature is that there are no parts of the reaction zone within the interior of the reactor that are not in contact with the dissolved polymeric product.

As stated above, both the solution and the homogeneous supercritical polymerization processes provide polymers dissolved in a homogeneous fluid state where the polymer-containing fluid fills the entire volume of the reactor. Because in both solution and supercritical polymerization processes the polymer-containing reaction mixture fills the entire volume of the polymerization reactor, the polymer may get into contact with cold parts of the reactor, may crystallize and thus cause fouling at those cold spots in the interior reactor volume, and/or in its interconnected parts, such as stirrers of stirred reactors, or feed or recycle ports. Fouling in turn results in serious operational issues in terms of costly reactor downtime required for cleaning that correspondingly decreases production efficiencies. Hence, there is a need for improved reactor designs and methods of operating reactors when polymerizing polymers via either the solution process or supercritical process to reduce the propensity for fouling of the interior reactor volume. The methods disclosed herein offer reduced fouling and fouling-free stirrer and feed port designs and operation conditions for homogeneous supercritical and solution polymerization processes.

SUMMARY

Reactor designs and methods of operating such reactor designs for minimizing and eliminating fouling in homogenous polymerization processes (such as solution and homogeneous supercritical polymerization) are provided.

According to the present disclosure, an advantageous method for reducing reactor fouling in a homogenous polymerization process, includes (a) providing one or more reactors with one or more feed entry ports wherein the reactors are configured in parallel, in series, or a combination thereof, (b) feeding to the one or more reactors through the one or more feed entry ports one or more reactor feed streams comprising: 1) an olefin monomer, 2) one or more catalyst systems, 3) optional one or more comonomers, 4) optional one or more scavengers, 5) optional one or more diluents or solvents, and 6) combinations thereof, wherein the one or more reactors are at a temperature above the solid-fluid phase-transition temperature of the polymerization system and a pressure no lower than 10 MPa, or no lower than 5 MPa, or no lower than 1 MPa, or no lower than 0.1 MPa, or no lower than 0.01 MPa below the cloud point pressure of the polymerization system and less than 1500 MPa, wherein the polymerization system for each reactor is in its dense fluid state and comprises the olefin monomers, any comonomer present, any diluent or solvent present, any scavenger present, and the polymer product, wherein the catalyst system for each reactor comprises one or more catalyst precursors, one or more activators, and optionally, one or more catalyst supports, and wherein the linear velocity of the one or more reactor feed streams passing through each of the one or more feed entry ports is greater than or equal to 0.3 m/min.

A further aspect of the present disclosure relates to an advantageous reactor for reducing fouling in a homogenous polymerization process, including a tank, loop, or tubular reactor with one or more feed entry ports, wherein the linear velocity of the reactor feed streams that comprise: 1) an olefin monomer, 2) one or more catalyst systems, 3) optional one or more comonomers, 4) optional one or more scavengers, 5) optional one or more diluents or solvents, and 6) combinations thereof passing through each of the one or more feed entry ports is greater than or equal to 0.3 m/min.

These and other features and attributes of the disclosed reactor designs and the methods of operating such reactor designs for fouling prevention in solution and supercritical processes and their advantageous applications and/or uses will be apparent from the detailed description that follows, particularly when read in conjunction with the figures appended hereto.

BRIEF DESCRIPTION OF THE DRAWINGS

To assist those of ordinary skill in the relevant art in making and using the subject matter hereof, reference is made to the appended drawings, wherein.

DEFINITIONS

For purposes of this disclosure and the claims thereto:

A catalyst system is defined to be the combination of one or more catalyst precursor compounds and one or more activators. Any part of the catalyst system can be optionally supported on solid particles, in which case the support is also part of the catalyst system. The catalyst system may be prepared outside the reactor in a separate vessel or in the catalyst feed line by combining and mixing the precursor and activator components, or could be prepared in-situ by feeding the precursor and the activator components separately and mixing them in the reactor.

Dense fluids are defined as fluids in their liquid or supercritical states with densities greater than 300 kg/m$^3$.

The polymerization system can form one single fluid phase or two fluid phases. Homogeneous single-phase polymerization systems typically are advantageous due to their reduced propensity for fouling the lines and vessels downstream of the reactor.

Solid-fluid phase transition temperature is defined as the temperature at which a solid polymer phase separates from the polymer-containing polymerization system at a given pressure. The solid-fluid phase transition temperature can be determined by temperature reduction at constant pressure starting from temperatures at which the polymer is fully dissolved in the polymerization system. The solid-fluid phase transition temperature can be determined by monitoring turbidity in addition to other known measurement techniques. At the solid-fluid phase transition the polymerization system becomes turbid due to the formation of the solid phase.

Solid-fluid phase transition pressure is defined as the pressure at which a solid polymer phase separates from the polymer-containing polymerization system at a given temperature. The solid-fluid phase transition pressure can be determined by pressure reduction at constant temperature starting from pressures at which the polymer is fully dissolved in the polymerization system. Solid-fluid phase transition pressure can be determined by monitoring turbidity in addition to other known measurement techniques. At the solid-fluid phase transition the polymerization system becomes turbid due to the formation of the solid phase.

The cloud point is the pressure below which, at a given temperature, the polymer-containing polymerization system becomes turbid as described in J. Vladimir Oliveira, C. Dariva and J. C. Pinto, Ind. Eng, Chem. Res. 29, 2000, 4627. The cloud point can be measured by shining a helium laser through the selected polymerization system in a cloud point cell onto a photocell and recording the pressure at the onset of light scattering (turbidity) for a given temperature.

A higher α-olefin is defined as an α-olefin having four or more carbon atoms.

Use of the term "polymerization" encompasses any polymerization reaction such as homopolymerization and copolymerization. Copolymerization encompasses any polymerization reaction of two or more monomers.

The new numbering scheme for the Periodic Table Groups is used as published in Chemical and Engineering News, 63(5), 27 (1985).

When a polymer is referred to as comprising an olefin, the olefin present in the polymer is the polymerized form of the olefin.

An oligomer is defined to be compositions having 2-75 monomer units.

A polymer is defined to be compositions having 76 or more monomer units.

A series reactor cascade can include two or more reactors connected in series, in which the effluent of an upstream reactor is fed to the next reactor downstream in the reactor cascade. Besides the effluent of the upstream reactor(s), the feed of any reactor can be augmented with any combination of additional monomer, catalyst, scavenger, or solvent fresh or recycled feed streams. In a parallel reactor configuration, the reactor or reactors in series cascade that form a branch of the parallel reactor configuration is referred to as a reactor train.

Polymerization system is defined to be monomer(s) plus optional comonomer(s) plus polymer(s) plus optional inert solvent(s)/diluent(s) plus optional scavenger(s). Note that for the sake of convenience and clarity, the catalyst system is always addressed separately in the present discussion from other components present in a polymerization reactor. In this regard, the polymerization system is defined here narrower than customary in the art of polymerization that typically considers the catalyst system as part of the polymerization system. By the current definition, the mixture present in the polymerization reactor and in its effluent is composed of the polymerization system plus the catalyst system. Dense fluid polymerization systems have greater than 300 kg/m$^3$ fluid phase density, all of their components listed above, i.e., the monomer(s) plus optional comonomer(s) plus polymer(s) plus optional inert solvent(s)/diluent(s) plus optional scavenger(s), are in fluid state, or stating differently, none of their components is in its solid state. Note that these qualifications may be different for the catalyst system since it is not part of the polymerization system.

A homogeneous polymerization system contains all of its components dispersed and mixed on a molecular scale. In our discussions, homogeneous polymerization systems are meant to be in their dense fluid (liquid or supercritical) state. Note that our definition of the polymerization system does not include the catalyst system, thus the catalyst system may or may not be homogeneously dissolved in the polymerization system. A homogeneous system may have regions with concentration gradients, but there would be no sudden, discontinuous changes of composition on a micrometer scale within the system. In practical terms, a homogeneous polymerization system has all of its components in a single dense fluid phase. Apparently, a polymerization system is not homogeneous when it is partitioned to more than one fluid phase or to a fluid and a solid phase. The homogeneous fluid state of the polymerization system is represented by the single fluid region in its phase diagram.

A homogeneous polymerization process operates with a homogeneous polymerization system. Note that the catalyst system is not part of the polymerization system, thus it is not necessarily dissolved homogeneously in the polymerization system. A reactor in which a homogeneous polymerization process is carried out will be referred to as homogeneous polymerization reactor.

Pure substances, including all types of hydrocarbons, can exist in either a subcritical, or supercritical state, depending on their temperature and pressure. Substances in their supercritical state possess interesting physical and thermodynamic properties, which are exploited in this disclosure. In particular, as supercritical fluids undergo large changes in pressure, their density and solvency for polymers changes over a wide range. To be in the supercritical state, a substance must have a temperature above its critical temperature (Tc) and a pressure above its critical pressure (Pc). Mixtures of hydrocarbons, including mixtures of monomers, polymers, and optional solvents, have pseudo-critical temperatures (Tc) and pseudo-critical pressures (Pc), which for many systems can be approximated by mole-fraction-weighted averages of the corresponding critical properties (Tc or Pc) of the mixture's components. Mixtures with a temperature above their pseudo-critical temperature and a pressure above their pseudo-critical pressure will be said to be in a supercritical state or phase, and the thermodynamic behavior of supercritical mixtures will be analogous to supercritical pure substances. For purposes of this disclosure, the critical temperatures (Tc) and critical pressures (Pc) of certain pure substances relevant to the current invention are those that found in the Handbook of Chemistry and Physics, David R. Lide, Editor-in-Chief, 82nd edition 2001-2002, CRC Press, LLC. New York, 2001. In particular, the Tc and Pc of various molecules are:

| Name | Tc (K) | Pc (MPa) |
|---|---|---|
| Hexane | 507.6 | 3.025 |
| Isobutane | 407.8 | 3.64 |
| Ethane | 305.3 | 4.872 |
| Cyclobutane | 460.0 | 4.98 |
| Cyclopentane | 511.7 | 4.51 |
| 1-butene | 419.5 | 4.02 |
| 1-pentene | 464.8 | 3.56 |
| Pentane | 469.7 | 3.37 |
| Benzene | 562.05 | 4.895 |
| 1-hexene | 504.0 | 3.21 |
| Propane | 369.8 | 4.248 |
| Toluene | 591.8 | 4.11 |
| Methane | 190.56 | 4.599 |
| Butane | 425.12 | 3.796 |
| Ethylene | 282.34 | 5.041 |
| Propylene | 364.9 | 4.6 |
| Cyclopentene | 506.5 | 4.8 |
| Isopentane | 460.4 | 3.38 |
| Cyclohexane | 553.8 | 4.08 |
| Heptane | 540.2 | 2.74 |

273.2 K = 0° C.

The following abbreviations are used: Me is methyl, Ph is phenyl, Et is ethyl, Pr is propyl, iPr is isopropyl, n-Pr is normal propyl, Bu is butyl, iBu is isobutyl, tBu is tertiary butyl, p-tBu is para-tertiary butyl, TMS is trimethylsilyl, TIBA is tri-isobutylaluminum, MAO is methylaluminoxane, pMe is para-methyl, flu is fluorenyl, cp is cyclopentadienyl.

By "continuous" it is meant a system that operates (or is intended to operate) without interruption or cessation. For example a continuous process to produce a polymer would be one where the reactants are continually introduced into one or more reactors and polymer product is continually withdrawn.

The term "high boiling point diluent" refers to a hydrocarbon having a boiling point of 30° C. or more, or 50° C. or more, or 70° C. or more, or 100° C. or more, or 120° C. or more, or 150° C. or more than the boiling point of propylene (−47.6° C. at 760 mmHg).

Solution polymerization refers to a polymerization process in which the polymer is dissolved in a liquid polymerization system in which the solvent for the polymeric product is an inert solvent(s) or the monomer(s) or their blends. Solution polymerization comprises a liquid polymerization system. Solution polymerization may be performed at conditions where a vapor and a liquid phase are present, in which case the polymerization system comprises the liquid phase. Advantageously, solution polymerization is performed with liquid-filled reactors, in the substantial absence of a vapor phase. Liquid-filled reactor operations are characterized by reactor pressures that are at or above the bubble point of the polymerization system. Bubble point is defined as the pressure at which a liquid starts forming vapor bubbles at a given temperature. Bubble point pressures of hydrocarbon blends can be readily determined by standard techniques known in the art of chemical engineering. Methods suitable for conducting such calculations are equation of state methods, such as Peng Robinson or Suave Redlich Kwong. The bubble point of a liquid can be conveniently determined also by reducing the pressure at constant temperature of a compressed fluid until the first vapor bubble is formed. Solution polymerization is typically performed in a single homogeneous liquid phase, but solution polymerization comprising two liquid phases are also known. In the latter case, the polymerization system is below of its cloud point pressure but above of its solid-fluid phase transition pressure and temperature. In these two-phase liquid polymerizations systems, the polymerization system is typically partitioned into two liquid phases, a polymer-lean and a polymer-rich liquid phase. In a well-stirred polymerization reactor, these two phases are finely dispersed. Note, however, that these two-phase liquid polymerizations systems have none of their components in solid state.

Supercritical polymerization refers to a polymerization process in which the polymerization system is in its dense supercritical state, i.e. when the density of the polymerization system is above 300 g/L and its temperature and pressure are above the corresponding (pseudo)critical values. Supercritical polymerization is typically performed in a single homogeneous supercritical phase, but supercritical polymerization comprising two supercritical fluid phases is also contemplated. In the latter case, the polymerization system is below of its cloud point pressure but above of its solid-fluid phase transition pressure and temperature. In these two-phase supercritical fluid polymerizations systems, the polymerization system is typically partitioned into two fluid phases, a polymer-lean and a polymer-rich fluid phase. In a well-stirred polymerization reactor, these two phases are finely dispersed. Note, however, that these two-phase supercritical fluid polymerizations systems have none of their components in solid state.

Bulk polymerization refers to a polymerization process in which the dense fluid polymerization system contains less than 40 wt %, or less than 30 wt %, or less than 20 wt %, or less than 10 wt %, or less than 5 wt %, or less than 1 wt % of inert solvent or diluent. The product polymer may be dissolved in the dense fluid polymerization system or may form a solid phase. In this terminology, slurry polymerization, in which solid polymer particulates form in a dense fluid polymerization system containing less than 40 wt % of inert solvent or diluent, will be referred to as a bulk slurry polymerization process or bulk heterogeneous polymerization process. The polymerization process in which the polymeric product is dissolved in a single-phase dense fluid polymerization system containing less than 40 wt % of inert solvent or diluent will be referred to as bulk homogeneous polymerization process. The polymerization process in which the polymeric product is dissolved in a liquid polymerization system containing less than 40 wt %, or less than 30 wt %, or less than 20 wt %, or less than 10 wt %, or less than 5 wt %, or less than 1 wt % of inert solvent or diluent will be referred to as bulk solution polymerization process. The polymerization process in which the polymeric product is dissolved in a single-phase supercritical polymerization system containing less than 40 wt %, or less than 30 wt %, or less than 20 wt %, or less than 10 wt %, or less than 5 wt %, or less than 1 wt % of inert solvent or diluent will be referred to as bulk homogeneous supercritical polymerization process. This range of solvent concentrations generally corresponds to a monomer concentration in the reactor ranging from 8 to 16 mol/L.

Homogeneous supercritical polymerization refers to a polymerization process in which the polymer is dissolved in a single-phase dense supercritical fluid polymerization medium, such as an inert solvent or monomer or their blends in their supercritical state. As described above, when the supercritical fluid polymerization system contains less than 40 wt %, or less than 30 wt %, or less than 20 wt %, or less than 10 wt %, or less than 5 wt %, or less than 1 wt % of inert solvent and the polymer is dissolved in the dense supercritical fluid, the process is referred to as a bulk homogeneous supercritical polymerization process. Homogeneous supercritical polymerization should be distinguished from heterogeneous supercritical polymerizations, such as for example, supercritical slurry processes, the latter of which are performed in supercritical fluids but form solid polymer particulates in the polymerization reactor. Similarly, bulk homogeneous supercritical polymerization should be distinguished from bulk solution polymerization, the latter of which is performed in a liquid as opposed to in a supercritical polymerization system.

Fouling refers to accumulation and deposition of solid polymer in the interior reactor volume and/or in its interconnected parts such as feed and exit ports, stirrer (for stirred reactors), etc. For crystalline polymers, the polymer tends to accumulate and deposit on the reactor interior by crystallization on surfaces that are at or below the crystallization temperature of the polymer. Reactor fouling adds considerable operational losses and costs, including reduced production rates, increased downtime for cleaning, increased maintenance, etc.

Reaction zone refers to the interior of a polymerization reactor where both the catalyst system and the polymerization system are present and mixed intentionally. The reaction zone is defined as the reactor interior filled with the mixed polymerization and catalyst systems between the feed ports and the effluent ports. By "where both the catalyst system and the polymerization system are present and mixed intentionally" we mean the space where the polymerization reaction is designed to take place and the polymer is designed to be present as opposed to spaces where no reaction is intended to happen and no polymer is intended to be present, such as the interior of the catalyst and monomer feed ports, stirrer assembly, etc. Although the later spaces are directly coupled to the reaction zone, no polymer is intended to enter and no polymer is intended to be polymerized in those spaces.

DETAILED DESCRIPTION

In homogeneous supercritical polymerization and in solution polymerization operating with liquid-filled reactors, the polymer-containing reaction mixture, i.e., the polymerization system, fills the entire volume of the reactor. This in turn presents a special challenge since the polymer can solidify and cause fouling in any cold spots in the interior of the reactor volume and/or in its connected parts. In particular, the feed ports for the monomer, catalyst, and solvent/diluent are areas that are prone to fouling since they are typically colder than the reaction zone within the reactor. Fouling in catalyst and monomer feed ports may also occur when the polymer enters the feed port or monomer is polymerized in the feed port that due to back-diffusion or accidental back-flow. In addition, when the homogenous polymerization process is carried out in a stirred tank reactor, the stirrer assembly is prone to fouling due to polymer crystallization. Stirrers have heat sensitive parts, such as ball bearings, or magnets in case of magnetically coupled drive systems, or the motor in certain designs operating with an interior motor. These parts are typically maintained below polymerization temperatures to prevent mechanical failure and/or demagnetization. At those lower temperatures, the product polymer can solidify on parts of the stirrer, thus seizing it. After such failure, typically the whole stirrer assembly needs to be replaced or rebuilt, which is expensive and causes significant reactor downtime. To prevent fouling the stirrer, the stirrer assembly in the disclosed processes is continuously purged with fresh, polymer-free feed, advantageously with fresh or recycled polymer-free monomer feed or fresh or recycled polymer-free solvent feed or combination thereof. Since these stirrer parts are in contact with the cold feed and with the cooled section of the stirrer assembly, their temperature is below that of the reaction zone temperature. Hence, if the polymer can penetrate into this upstream colder region it can build up on the surfaces of the stirrer shaft and the housing eventually seizing the stirrer. The tendency for fouling generally increases when producing highly crystalline and high melting point polymers. The advantage of the disclosed reactor feed port and stirrer assembly designs and operating conditions is that they reduce or even completely eliminate such issues related to fouling feed ports and/or stirrer assemblies.

Thus, the disclosed reactor feed port and stirrer assembly designs and operating conditions ensure that for any homogeneous polymerization reactor design (stirred tank, tube, loop, etc.) operating in a continuous (continuous feed and continuous product removal) or quasi-continuous (intermittent feed and/or intermittent product removal) mode, no polymer enters and no polymer is made in the feed lines for the catalyst and for the monomer, thus minimize fouling in the said feed lines; and for mechanically stirred homogeneous polymerization reactors (e.g., stirred tanks) operating in a continuous (continuous feed and continuous product removal) or quasi-continuous (intermittent feed and/or intermittent product removal) mode, the stirrer assembly is effectively separated from the reaction zone so that no polymer enters and no polymer is made in the stirrer assembly, thus minimizing maintenance of the stirrer assembly.

All numerical values within the detailed description and the claims herein are understood as modified by "about."

Fouling Resistant Processes and Reactor Designs

In one form of the present disclosure, provided is an advantageous process for reducing reactor fouling in a homogenous polymerization process (solution process or homogeneous supercritical process) that includes one or more reactors configured in parallel, in series, or in a combination thereof. Each of the one or more reactors may include one or more feed entry ports. The number of feed entry ports for each of the reactors may be one, two, three, four, five, six, seven, eight, nine, ten or more. They may be placed anywhere on a reactor, thus they may be substantially at the same or at different positions along the axis, on the top, or on the bottom of a reactor, etc. The feed entry ports are used to feed an olefin monomer having generally two or more carbon atoms, and one or more catalyst systems. The feed entry ports may also be used to feed optional one or more comonomers, optional one or more scavengers, and optional one or more diluents or solvents. However, the ports connecting an upstream reactor to a downstream reactor in a reactor cascade to convey the reactor effluent from said upstream reactor to said downstream reactor in such cascades are not addressed by the disclosed methods and designs. Nor are included any other ports designed to deliver polymer-containing streams, such as, for example, a port on the return arm of a reactor internal or external circulation loop such as found, for example in loop reactors. The reactor feed components then form a dense (liquid or dense supercritical fluid) homogeneous polymerization system that is converted in the reaction zone of the reactor, which in turn forms a reactor effluent that includes a dense homogeneous fluid phase polymer-monomer mixture in each reactor. The disclosed designs and methods for reducing fouling in polymerization processes are particularly advantageous for homogeneous supercritical polymerizations and for solution polymerizations operating with liquid-filled reactors, in which the polymeric product is dissolved in the homogeneous polymerization system, which is not restricted to any particular part of the reactor interior, i.e., the dissolved polymer is in contact with entire reactor interior. These processes can only operate properly as long as the polymer remains in the homogenous polymerization system and does not form solids. The process in which solids drop out anywhere in the reactor or in its fixtures, such as feed ports, and for stirred tank reactors, in the stirrer assembly, is referred to fouling. Such fouling presents a serious operability issue typically leading to interruption or even complete shut down of the polymerization process.

To reduce or eliminate reactor fouling of the polymer, the linear velocity in the feed ports of a continuous homogeneous polymerization reactor delivering the olefin monomer, the one or more catalyst systems, the optional one or more comonomers, the optional one or more scavengers, and the optional one or more diluents or solvents should be set and maintained above a critical level to prevent the entering or the formation of polymer in those feed ports. The linear velocity of the dense fluid feeds (defined as the volumetric feed flow rate divided by the internal cross section of the said feed port, and expressed in length/time, such as, for example, m/min, or inch/min, or foot/min, or m/h, etc., passing through each of the one or more feed entry ports should be greater than or equal to 0.3, 0.5, 1.0, 5.0, or 10.0 m/min. The linear velocity of the reactor feeds may be readily set for a given feed flow range by properly sizing the internal diameter of the feed port. The reactor and its associated components may be fabricated from steel or more advantageously stainless steel and may be internally polished or coated by, for example, a silicon or fluorinated hydrocarbon polymer to further assist in fouling reduction.

In another form of the present disclosure, provided is another advantageous process for reducing reactor fouling in a continuous homogenous polymerization process (solution process or homogeneous supercritical process) that includes one or more reactors configured in parallel, in series or in a combination thereof. In this form, the linear velocity of the dense fluid feeds passing through each of the one or more feed entry ports of the one or more reactors configured in parallel, in series or in a combination thereof should be greater than or equal to 0.3, 0.5, 1.0, 5.0, or 10.0 m/min. In addition to setting the above minimum linear velocities, one or more, or all of the feed ports of the one or more reactors configured in parallel, in series or in a combination thereof may be extended beyond the interior wall of the reactor to a length equal to between 2 and 20% of the internal radius of the reactor, or alternatively greater than or equal to 2, 5, 10, 15 or 20% of the internal radius of the reactor. Thus, for example, if the internal radius of the reactor is 20 cm, the feed port may extend into the reaction zone by a length of from 0.4 to 4.0 cm, or from greater than or equal to 0.4 cm to greater than or equal to 4.0 cm. The extended feed port brings the feed components directly into the hotter interior of the reactor as opposed to the cooler reactor wall, which further decreases the propensity for fouling. One non-limiting method of extending the feed ports away from the reactor walls into the reaction zone is through the use of a cylindrical (tubular shape) feed port insert that is connected to the opening in the reactor wall for the feed port.

Figure 1:
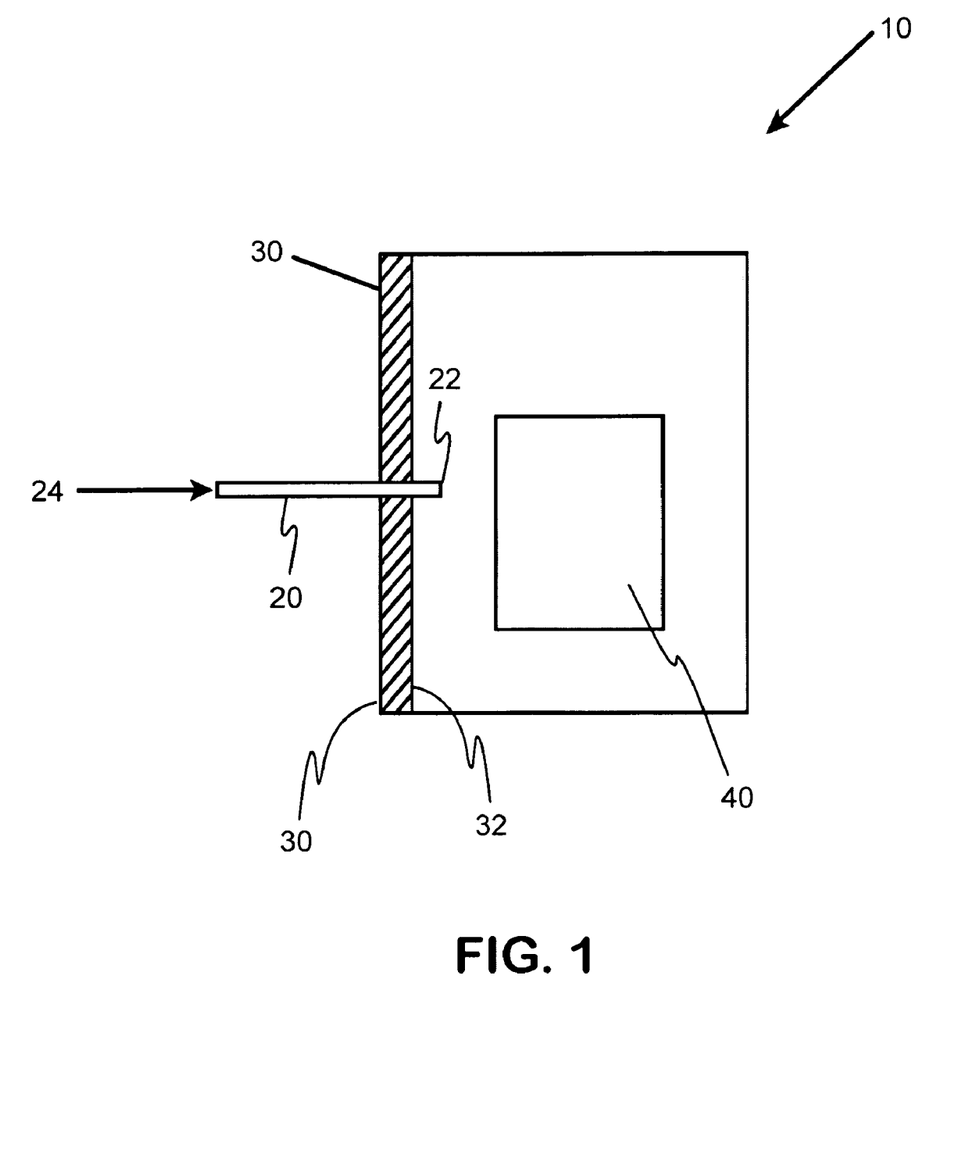
FIG. 1 depicts an exemplary schematic of a reactor port with an insert delivering feed to the well-mixed interior of the reactor to decrease the propensity for fouling.

FIG. 1 is an exemplary schematic of a cross-section of a portion of a reactor 10 that depicts an extended feed port 20 in relation to the reactor wall 30. The tip 22 of the feed port 20 protrudes from the inside wall 32 of the reactor 10 such that the one or more feed components (reactor feed streams) 24 are transported to the interior of the reactor 10 within the reaction zone 40 of the reactor. The extended feed port 20 in combination with the linear velocity of the reactor feed streams passing through each of the one or more the feed ports of greater than or equal to 0.3, 0.5, 1.0, 5.0, or 10.0 m/min further decreases or even eliminates the fouling of the reactor interior and its associated components. Reactor effluents exit the reactor through one or more reactor exit ports (not shown).

The methods and designs for reducing reactor fouling disclosed herein may be deployed in any type of polymerization reactor operating in a continuous (continuous feed and continuous product removal) or quasi-continuous (intermittent feed and/or intermittent product removal) mode. The optimal reactor design may be determined by standard engineering techniques known to those skilled in the art of chemical engineering. Non-limiting exemplary reactor designs include autoclave reactors (also referred to as a stirred tank), stirred tank with or without an external loop, tubular reactor, and loop reactor. An autoclave or stirred tank reactor that operates in a continuous mode is also referred to in the art of chemical engineering as continuous stirred tank reactor or CSTR. The reactors may operate adiabatically or may be cooled. The cooling may be achieved within the reactor, or through a reactor jacket, or dedicated heat exchange loops may be applied. The reactors of the polymerization system may be mechanically stirred or unstirred. When more than one reactor is utilized, a combination of autoclave, tank, loop and tubular reactors is also possible.

When more than one reactor is utilized, the members are not necessarily constructed the same way, for example, the individual members may be stirred, unstirred, or a combination thereof. The individual reactors may also be of equal or different size. The optimal reactor configuration and sizes may be determined by standard engineering techniques known to those skilled in the art of chemical engineering.

The methods and designs for reducing reactor fouling disclosed herein relate to processes to polymerize olefins comprising contacting one or more olefins having at least two carbon atoms with a suitable catalyst compound and an activator in a fluid reaction medium comprising one or two fluid phases in a reactor. In one embodiment, the fluid reaction medium is in its supercritical state. Catalyst precursor compound and activator may be delivered as a solution or slurry, either separately to the reactor, mixed in-line just prior to the reactor, or mixed and pumped as an activated solution or slurry to the reactor. In one particular embodiment, two solutions are mixed in-line. The catalyst feed may also be mixed in-line upstream of the reactor with other feed components, particularly with monomer-free feed components, such as scavengers and/or inert solvents/diluents. The catalyst feed and the monomer-containing feeds are typically not mixed upstream of the reactor to prevent polymerization under uncontrolled conditions and/or to prevent fouling caused by the polymer made at the typically lower temperatures of said feed streams as compared to the temperature of the reactor. Polymerizations may be carried out in either single reactor operation, in which monomer, comonomers, catalyst(s)/activator(s), scavenger(s), and optional solvent(s) are added continuously to a single reactor or in series reactor operation, in which the above components are added to two or more reactors connected in series or in parallel. In a series reactor configuration, the catalyst components may be added to the first reactor in the series. The catalyst component may also be added to each reactor in the series reactor train. The fresh catalyst feed if added to more than one reactor in the series train may be the same or different to each reactor and their feed rates may be the same or different.

Polymerization processes of the process for reducing reactor fouling disclosed herein also comprehend high-pressure reactors where the reactor is substantially unreactive with the polymerization reaction components and is able to withstand the high pressures and temperatures that occur during the polymerization reaction. Withstanding these high pressures and temperatures may allow the reactor to maintain the fluid reaction medium in its supercritical condition. Higher pressures may also be required to maintain liquid-filled reactor conditions in solution polymerization, i.e., pressures above the bubble point of the liquid polymerization system. Non-limiting exemplary reactors include autoclave, pump-around loop or autoclave, and tubular, reactors, and any combination thereof.

The polymerization processes of the process for reducing reactor fouling disclosed herein may operate efficiently in autoclave (also referred to as stirred tank) and tubular reactors. Typically, autoclave reactors have length-to-diameter ratios of 1:1 to 20:1 and are fitted with a high-speed (up to 2000 RPM) multiblade stirrer and optionally baffles arranged for optimal mixing. Commercial autoclave pressures are typically greater than 5 MPa with a maximum of typically less than 260 MPa. The maximum pressure of commercial autoclaves, however, may become higher with advances in mechanical and material science technologies.

When the autoclave has a low length-to-diameter ratio (such as less than four), the feed streams may be injected at one position along the length of the reactor. Reactors with large diameters may have multiple injection ports at nearly the same or different positions along the length of the reactor. When they are positioned at the same length of the reactor, the injection ports are radially distributed to allow for faster intermixing of the feed components with the reactor content. In the case of stirred tank reactors, the separate introduction of the catalyst and monomer(s) may be advantageous in preventing the possible formation of hot spots in the unstirred feed zone between the mixing point and the stirred zone of the reactor. Injection of the feed components at two or more positions along the length of the reactor is also possible and may be advantageous. In one exemplary embodiment, in reactors where the length-to-diameter ratio is from 4 to 20, the reactor may contain up to six different injection or feed positions along the reactor length with multiple ports at some or each of the lengths.

Additionally, in the larger autoclaves, one or more lateral mixing devices may support the high-speed stirrer. These mixing devices can also divide the autoclave into two or more zones. Mixing blades on the stirrer may differ from zone to zone to allow for a different degree of plug flow and back mixing, largely independently, in the separate zones. Two or more autoclaves with one or more zones may connect in a series reactor cascade to increase residence time or to tailor polymer structure in a reactor train producing a polymer blending component. As previously described, a series reactor cascade or configuration consists of two or more reactors connected in series, in which the effluent of at least one upstream reactor is fed to the next reactor downstream in the cascade. Besides the effluent of the upstream reactor(s), the feed of any reactor in the series reactor cascade can be augmented with any combination of additional monomer, catalyst, or solvent fresh or recycled feed streams. Therefore, it should be understood that the polymer leaving a reactor train of the process disclosed herein may itself be a blend of the same polymer with increased molecular weight and/or compositional dispersion or even a blend of homo- and copolymers.

Tubular reactors may also be used in the process for reducing reactor fouling disclosed herein and more particularly tubular reactors capable of operating up to about 350 MPa. Tubular reactors are fitted with external cooling and one or more injection or feed points along the (tubular) reaction zone. As in autoclaves, these injection points serve as entry points for monomers (such as propylene), one or more comonomer, catalyst, or mixtures of these. In tubular reactors, external cooling often allows for increased monomer conversion relative to an autoclave, where the low surface-to-volume ratio hinders any significant heat removal. Tubular reactors have a special outlet valve that can send a pressure shockwave backward along the tube. The shockwave helps dislodge any polymer residue that has formed on reactor walls during operation. Alternatively, tubular reactors may be fabricated with smooth, unpolished internal surfaces to address wall deposits. Tubular reactors generally may operate at pressures of up to 360 MPa, may have lengths of 100-2000 meters or 100-4000 meters, and may have internal diameters of less than 12.5 cm. Typically, tubular reactors have length-to-diameter ratios of 10:1 to 50,000:1 and include up to 10 different injection or feed positions along its length for the feed components.

Reactor configurations that pair autoclaves with tubular reactors are also contemplated within the scope of the process for reducing reactor fouling disclosed herein. In this reactor system, the autoclave typically precedes the tubular reactor or the two types of reactors form separate trains of a parallel reactor configuration. Such reactor systems may have injection of additional catalyst and/or feed components at several points in the autoclave, and more particularly along the tube length. In both autoclaves and tubular reactors, at injection, feeds are typically cooled to near ambient temperature or below to provide maximum cooling and thus maximum polymer production within the limits of maximum operating temperature. In autoclave operation, a preheater may operate at startup, but not after the reaction reaches steady state if the first mixing zone has some back-mixing characteristics. In tubular reactors, the first section of double-jacketed tubing may be heated (especially at start ups) rather than cooled and may operate continuously. A well-designed tubular reactor is characterized by plug flow wherein plug flow refers to a flow pattern with minimal radial flow rate differences. In both multizone autoclaves and tubular reactors, catalyst can not only be injected at the inlet, but also optionally at one or more points along the reactor. The catalyst feeds injected at the inlet and other injection points can be the same or different in terms of content, density, and concentration. Catalyst feed selection allows polymer design tailoring within a given reactor or reactor train and/or maintaining the desired productivity profile along the reactor length.

Autoclave reactors operating with a stirrer, particularly high-pressure autoclaves operating with a stirrer represent an additional challenge related to fouling. Stirrer mechanisms typically have heat-sensitive parts, such as lubricated bearings, motors, magnets, etc. These heat-sensitive parts are directly connected to but often kept well below the temperature of the reaction zone, thus create a cold spot that is often prone to fouling. This is particularly the case for high-pressure reactors, for which no good mechanical sealing solutions are available. For that reason, these autoclaves often use magnetically coupled drives for smaller reactors, such as the Magnedrive design by the Autoclave Engineers Division of Snap-tite, Erie, Pa. Larger reactors may even have the entire drive system, including the motor, inside the high-pressure reactor interior. Particularly in the later instances, operations in the supercritical or liquid-filled regime create a direct fluid connection of the polymer containing reaction mixture with the cold parts of the stirrer assembly.

Thus, in another form of the process for reducing reactor fouling disclosed herein, the reactor includes a stirrer mechanism wherein the stirrer assembly is continuously flushed with a polymer- and non-volatile solute-free feed stream. The flushing medium advantageously passes through the entire stirrer assembly before entering the interior of the reactor, i.e., the reaction zone, to keep the polymer-containing polymerization system away from the cold parts of the stirrer assembly. The purging feed stream passes through the clearings of the said stirrer assembly and typically enters the reaction zone along the stirrer shaft where the stirrer shaft enters the reaction zone. The stirrer feed entry port may be, for example, an annular-shaped flow channel that surrounds the stirrer shaft. Alternatively, the stirrer feed entry port may include two or more flow channels that surround the circumference of the stirrer shaft where it enters the reactor. The stirrer feed entry port is often a flow channel that is not restricted in shape, which is located between the moving stirrer shaft and the stationary housing of the stirrer or the reactor wall. The stirrer assembly is purged by feeding a fluid (gas, liquid or supercritical medium) through the stirrer feed entry port. The stirrer purge stream may be any feed stream of the reactor, except for streams that contain non-volatile solutes, such as the catalyst or activator feed streams, or polymers. Non-volatile solutes and dissolved polymeric materials can lead to deposits in the stirrer assembly thus should be avoided. The stirrer purge stream advantageously may include the monomer feed and/or an inert fluid, such as an inert gas or a solvent, or their mixture. The stirrer purge stream typically enters the stirrer assembly at its furthermost point from the reaction zone and exits into the reaction zone of the reactor thus purging the entire interior of the stirrer assembly upstream of the reaction zone. The stirrer purge stream passes through the stirrer feed entry port advantageously at a linear velocity of greater than or equal to 0.3, 0.5, 1.0, 5.0, or 10.0 m/min. However, advantageously, the one or more catalyst systems and/or polymer-containing feed streams are not fed to the stirrer fed entry port to avoid the deposition of catalyst or polymer solids. The constant purging of the stirrer assembly with a polymer- and non-volatile solute-free feed stream further significantly reduces the or even eliminates fouling of the reactor stirrer assembly.

In yet another form of the process for reducing reactor fouling disclosed herein, the improved reactor stirrer assembly may further include an extension of the stirrer feed port that extends the point at which the stirrer purge stream enters the reactor away from the reactor wall. The extension surrounding the stirrer shaft may be tubular, annular or other non-limiting shape, and is advantageously thin walled in order to facilitate heat transfer. The stirrer feed port extension may have a wall thickness of less than 5, or 4, or 3, or 2, or 1 mm in order to ensure that the entry port of the purging fluid stream is sufficiently heated by the reaction medium to avoid fouling at the entry point. In this form, the linear velocity of the reactor feed components constituting the purge stream passing through the stirrer feed entry port should be again greater than or equal to 0.3, 0.5, 1.0, 5.0, or 10.0 m/min. The stirrer feed entry port, which may be tubular in shape, may advantageously extend beyond the interior wall of the reactor by greater than or equal to 2%, 5%, or 10% of the axial length of the mechanically stirred reactor interior. The percentage is typically higher for smaller reactors. For example, for reactors of 1 L or less volumes the percentage is advantageously close to 10%, while for large reactors of over 500 L in size, the percentage is advantageously close to 2%. The extended stirrer feed port brings the feed components directly into the hotter interior of the reactor as opposed to the cooler reactor wall, which further decreases the propensity for fouling of the polymer on the interior surfaces of the reactor. One non-limiting method of extending the feed ports away from the reactor walls is through the use of a tubular or annular feed port attachment that is connected to the opening in the reactor wall where the stirrer shaft enters the reactor wall.

Figure 2:
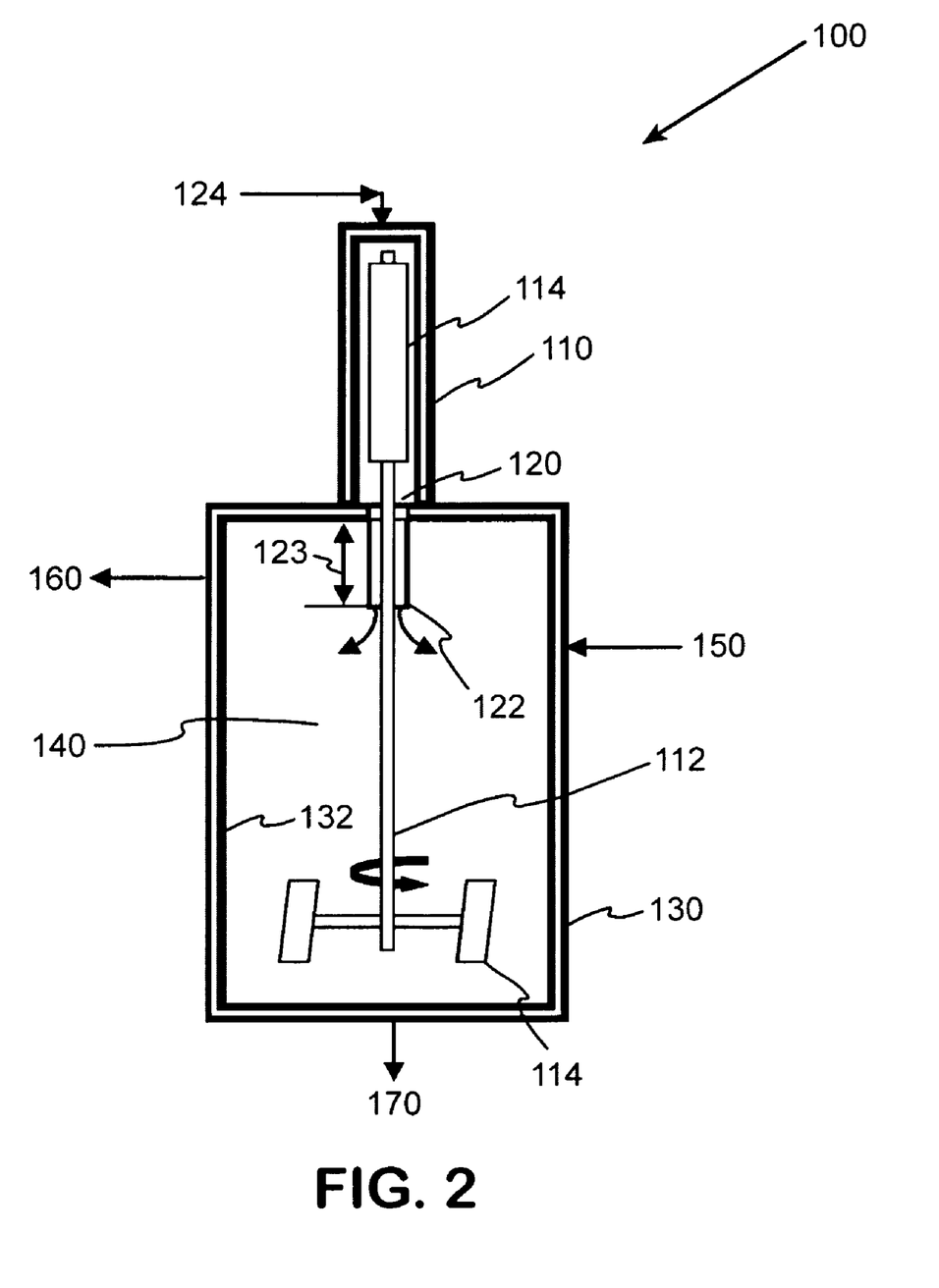
FIG. 2 depicts an exemplary schematic of a reactor stirrer assembly to decrease the propensity for fouling.

FIG. 2 is an exemplary schematic of a reactor 100 for fouling prevention disclosed herein including a stirrer assembly 110. The stirrer assembly 110 includes a rotating shaft 112 driven by a Magnedrive 114. At the end of the stirrer shaft 112 are depicted two paddles 114 for mixing the reactor contents. The reactor feed components (an olefin monomer, optional one or more comonomers, optional one or more scavengers, optional one or more diluents or solvents, and combinations thereof), also referred to as a stirrer purge fluid or stream 124, enter the reactor wall 130 through a stirrer feed entry port 120 that surrounds the outside of the stirrer shaft 112. The tip 122 of the stirrer feed entry port 120 protrudes or extends from the inside wall 132 of the reactor 100 such that the one or more feed components of the stirrer purge stream 124 are transported to the interior of the reactor 100 within the reaction zone 140. The length of the stirrer feed port extension 123 may be varied depending upon the size of the reactor 100. The extended stirrer feed port 120 in combination with the linear velocity of each of the reactor feed components passing through the stirrer feed entry port of greater than or equal to 0.3, 0.5, 1.0, 5.0, or 10.0 m/min further decreases or even eliminates the fouling of the reactor interior and its associated components with polymer. In this exemplary schematic of the reactor stirrer assembly 110, the stirrer purge stream 124 comprising feed components does not include one or more catalyst systems. The one or more catalyst systems are fed into the reactor 100 through a reactor feed entry port 150 that is not associated with the stirrer assembly. The reactor effluent exits the reactor through one or more reactor exit ports 160. The stirred reactor 100 also includes a drain port 170 at the bottom of the tank for draining excess solvent/diluent for recycle or disposal.

In still yet another form of the process for reducing reactor fouling disclosed herein, the reactor is a stirred autoclave reactor or a tank reactor with a stirrer mechanism, wherein each of the reactor feed components (olefin monomer, one or more catalyst systems, optional one or more comonomers, optional one or more scavengers, and optional one or more diluents or solvents) pass through each of the one or more feed entry ports at a linear velocity greater than or equal to 0.3, 0.5, 1.0, 5.0, or 10.0 m/min, and wherein the purging fluid (olefin monomer, optional one or more comonomers, optional one or more scavengers, and optional one or more diluents or solvents) to the improved stirrer assembly passes through the stirrer feed entry port at a linear velocity greater than or equal to 0.3, 0.5, 1.0, 5.0, or 10.0 m/min. In addition, one or more of the reactor feed entry ports may be extended away the interior reactor wall by between 2 and 20% of the internal radius of the reactor, or alternatively greater than or equal to 2, 5, 10, 15 or 20% of the internal radius of the reactor. Moreover, the stirrer feed entry port may be extended away the interior reactor wall by greater than or equal to 2%, or 5%, or 10% of the axial length of the reactor interior. In this form of the process for reducing reactor fouling disclosed herein including a combination of improved feed component feed port design and velocity as well as the improved stirrer assembly, the propensity for fouling on the internal surfaces of the reactor, including the stirrer assembly fluidly connected to the reactor interior, is further decreased when polymerizing in a homogenous polymerization reactor, particularly when polymerizing in a homogeneous supercritical or in a liquid-filled solution polymerization reactor.

The processes for reducing reactor fouling disclosed herein utilize the improved reactor designs previously described, and hence other forms of the present disclosure may be stated in terms of improved reactor designs for reducing and/or eliminating fouling in homogeneous polymerization processes. The remainder of the detailed description sets forth the details of the homogenous polymerization processes (homogeneous supercritical process and solution process) where the processes and reactor designs previously described for reducing fouling are advantageous. The advantageous processes and reactors for fouling reduction disclosed herein include at least one reactor that operates with a homogeneous dense fluid phase. Polymerization processes that operate in a homogenous dense fluid phase use either inert solvent(s) or monomer(s) or their mixtures as a solvent/diluent in their liquid or supercritical state. Hence, the one or more reactors disclosed herein operate with polymerization systems in their homogeneous supercritical or in their liquid state. When operating with liquid polymerization systems, the disclosed designs and conditions are particularly advantageous in the liquid-filled reactor operation mode. In both the supercritical and solution polymerization reactors, the process may be a bulk polymerization process operating with less than 40%, or less than 30%, or less than 20 wt % or less than 10 wt % or less than 5 wt % of inert solvent present in the reactor, and in some embodiments, with bulk monomers essentially free (less than 1 wt %) of inert solvents. In one embodiment of the disclosed process, the reactors operate at bulk homogeneous supercritical conditions as has been disclosed in U.S. Patent Publication Nos. 2006-0211832 and 2006-0025545, herein incorporated by reference in their entirety.

In another embodiment, the one or more reactors operate at conditions where the polymer dissolution is substantially aided by an inert solvent (solution process where the polymerization medium contains more than 40 wt % solvent, typically more than 60 wt % solvent) as has been disclosed in PCT Publication No. WO 2006/044149, herein incorporated by reference in its entirety. This range of solvent concentrations generally corresponds to a monomer concentration in the reactor up to 2.0 mol/L. In yet another embodiment, one or more of the reactors operate in the homogeneous supercritical state and one or more of the reactors included in the parallel bank of reactors operate in the solution state (combination of solution process and homogeneous supercritical process reactors). Both solution and homogeneous supercritical polymerization processes provide polymers dissolved in a fluid state, which increases the propensity for reactor fouling. Both solution and homogeneous supercritical polymerization processes providing polymers in a homogeneous fluid state may be performed in a bulk monomer phase using essentially pure monomer(s) as solvent or may keep the polymer in the homogeneous fluid state by employing an inert solvent in substantial concentrations (i.e., 40 wt % or more). The solution process provides for a polymer-containing liquid phase either in an inert solvent or in the essentially neat monomer or in their mixture in their liquid state. The homogeneous supercritical process provides for the polymeric fluid state by dissolving the polymeric product either in an inert solvent or in the essentially neat monomer or in their mixture in their supercritical state.

In another embodiment, the improved process and reactor designs for fouling prevention disclosed herein may be incorporated into one or more of the reactors associated with the improved in-line process for blending polymers to improve blend quality and reduce the capital and operating costs associated with a combined polymerization and blending plant disclosed in U.S. patent application Ser. No. 12/002,509, and U.S. patent application. Ser. No. 12/074,496 herein incorporated by reference in their entirety.

Homogeneous Polymerization Process Details

In one or more embodiments, the process includes contacting, in a polymerization system, one or more monomers (advantageously propylene) with a catalyst, an activator, optionally comonomer (advantageously ethylene, butene-1, hexene-1, octene-1, or decene-1 and combinations thereof), and optionally inert diluent or solvent, at a temperature above 40° C., or above 50° C., or above 60° C., or above 70° C., or above 80° C. and at a pressure above 1 MPa, or above 5 MPa, or above 10 MPa, or above 13 MPa, or above 28 MPa. The polymerization takes place in a homogeneous polymerization system within the reactor.

In one or more embodiments, the density of the polymerization system is about 0.3 g/mL or more. In one or more embodiments, the density of the polymerization system is about 0.4 g/mL or more. In one or more embodiments, the density of the polymerization system is about 0.5 g/mL or more. In one or more embodiments, the density of the polymerization system is about 0.6 g/mL or more. In one or more embodiments, the density of the polymerization system is of from 0.3 g/mL to 0.75 g/mL or from 0.35 to 0.70 g/mL.

In one or more embodiments, the steady state polymer yield (i.e., conversion of monomer to polymer product) per pass is at least 5 wt % of the monomer. In one or more embodiments, the conversion of monomer to polymer product in a single pass is at least 10 wt % of the monomer. In one or more embodiments, the conversion of monomer to polymer product in a single pass is at least 20 wt % of the monomer. In one or more embodiments, the conversion of monomer to polymer product in a single pass is at least 30 wt % of the monomer. In one or more embodiments, the conversion of monomer to polymer product in a single pass is at least 40 wt % of the monomer. In one or more embodiments, the conversion of monomer to polymer product in a single pass is at least 50 wt % of the monomer. In one or more embodiments, the conversion of monomer to polymer product in a single pass is at least 60 wt % of the monomer. In one or more embodiments, the conversion of monomer to polymer product in a single pass is at least 70 wt % of the monomer. In one or more embodiments, the conversion of monomer to polymer product in a single pass is at least 80 wt % of the monomer. In one or more embodiments, the conversion of monomer to polymer product in a single pass is at least 90 wt % of the monomer.

In one or more embodiments, the polymerization conditions are sufficient to dissolve the polymer product in the monomer(s) present in the liquid state (i.e. "bulk solution polymerization"). In one or more embodiments, the polymerization conditions are sufficient to dissolve the polymer product in the monomer(s) present in the supercritical state (i.e "bulk supercritical polymerization"). In one or more embodiments, the critical temperature and pressure of reactor blends are different from the critical values of pure components, and thus supercritical operations at temperatures lower than the critical temperature of one or more of the pure monomers (e.g., 92° C. for propylene) are possible. In one or more embodiments, near-amorphous materials with low melting points as well as amorphous materials can be produced without fouling even below the critical temperature of the reactor blends, i.e., at temperatures that correspond to the condensed liquid state of the polymerization system in the reactor. In these instances, the operating temperature can be below the boiling point of the reaction mixture and thus the reactor can operate at what is often referred to as liquid-filled conditions. In some instances, such operation mode could be desired to achieve high molecular weight (MW) and thus low melt flow rate (MFR), particularly in the manufacture of copolymers, such as propylene-ethylene or ethylene-higher olefin copolymers.

In one or more embodiments, the reaction temperature and pressure can be selected so that the polymerization system remains at a pressure below the polymer's cloud point in the particular polymerization system, resulting in a two-phase polymerization system: a polymer rich phase and a polymer lean phase. Some embodiments that are below the polymer's cloud point nonetheless operate above the polymer's crystallization temperature. The terms "two-phase system" or "two-phase polymerization system" refer to a polymerization system having two and, advantageously, only two phases. In certain embodiments, the two phases are referenced as a "first phase" and a "second phase." In certain embodiments, the first phase is or includes a "monomer phase," which includes monomer(s) and can also include diluent and some or all the product of polymerization. In certain embodiments, the second phase is or includes a solid phase, which can include products of polymerization, e.g., macromers and polymer product, but not monomers, e.g., propylene.

In one or more embodiments, the polymerization temperature is above the cloud point of the single-phase polymerization system at the reactor pressure. More advantageously, the temperature is 2° C. or more above the cloud point of the polymerization system at the reactor pressure. In another embodiment, the temperature is between 40 and 250° C., between 50 and 200° C., between 60 and 180° C., or between 70 and 150° C. In another embodiment, the temperature is above 40, 50, 60, 70, 80, 90, 95, 100, 110, or 120° C. In another embodiment, the temperature is below 250, 200, 190, 180, 170, 160, or 150° C. In one or more embodiments, the polymerization temperature is from about 40° C. to about 190° C. In one or more embodiments, the polymerization temperature is about 40° C. to about 160° C. In one or more embodiments, the polymerization temperature is about 40° C. to about 140° C. In one or more embodiments, the polymerization temperature is about 40° C. to about 130° C. In one or more embodiments, the polymerization temperature is about 40° C. to about 105° C. In one or more embodiments, the polymerization temperature is about 40° C. to about 95° C. In one or more embodiments, the polymerization temperature is about 40° C. to about 65° C.

In one or more embodiments, the polymerization temperature is above the solid-fluid phase transition temperature of the polymerization system at the reactor pressure. Advantageously, the temperature is at least 2° C. or at least 5° C. above the solid-fluid phase transition temperature of the polymerization system at the reactor pressure. More advantageously, the temperature is at least 10° C. above the solid-fluid phase transformation point of the polymerization system at the reactor pressure.

In one or more embodiments, the polymerization pressure is no lower than the fluid-fluid phase transition pressure of the polymerization system at the reactor temperature. In one or more embodiments, the polymerization pressure is no lower than 10 MPa below, or no lower than 5 MPa below, or no lower than 2 MPa below, or no lower than 1 MPa below, or no lower than 0.1 MPa below, or no lower than 0.01 MPa below the cloud point of the polymerization system at the reactor temperature. In one or more embodiments, the pressure is between 1 MPa and 300 MPa, between 13.8 MPa and 200 MPa, or between 20 and 150 MPa, or between 5 MPa and 100 MPa. In one or more embodiments, the pressure is above 1, 5, 10, 15, 20, 30, or 40 MPa. In one or more embodiments, the pressure is below 500, 300, 250, 200, 100, or 50 MPa. In one or more embodiments, the pressure is between 1 and 200 MPa, between 1 and 100 MPa, or between 1 and 50 MPa, or between 1 and 40 MPa, or between 1 and 30 MPa, or between 1 and 20 MPa, or between 1 and 15 MPa, or between 1 and 14 MPa, or between 1 and 13 MPa, or between 1 and 12 MPa, or between 1 and 11 MPa. In one or more embodiments, the pressure is about 13 MPa or more. In one or more embodiments, the pressure is about 13 MPa to about 42 MPa. In one or more embodiments, the pressure is about 13 MPa to about 35 MPa. In one or more embodiments, the pressure is about 13 MPa to about 28 MPa. In one or more embodiments, the pressure is about 13 MPa to about 20 MPa.

Monomers

Any monomer having one or more (non-conjugated) aliphatic double bond(s) and two or more carbon atoms can be used. Advantageous monomers include α-olefins, such as ethylene, propylene, butene-1, hexene-1, octene-1, and decene-1, substituted olefins, such as styrene, paramethylstyrene, vinylcyclohexane, etc., non-conjugated dienes, such as vinylcyclohexene, etc., α,ω-dienes, such as 1,5-hexadiene, 1,7-octadiene, etc., cycloolefins, such as cyclopentene, cyclohexene, cyclohexadiene, etc., norbornene, and the like.

In one or more embodiments, unsaturated monomer or monomers can be used. Advantageous monomers include $C_2$ to $C_{100}$ olefins, advantageously $C_2$ to $C_{60}$ olefins, advantageously $C_3$ to $C_{40}$ olefins advantageously $C_3$ to $C_{20}$ olefins, advantageously $C_3$ to $C_{12}$ olefins. In some embodiments advantageous monomers include linear, branched or cyclic alpha-olefins, advantageously $C_3$ to $C_{100}$ alpha-olefins, advantageously $C_3$ to $C_{60}$ alpha-olefins, advantageously $C_3$ to $C_{40}$ alpha-olefins advantageously $C_3$ to $C_{20}$ alpha-olefins, advantageously $C_3$ to $C_{12}$ alpha-olefins. Advantageous olefin monomers can be one or more of propylene, butene, pentene, hexene, heptene, octene, nonene, decene, dodecene, 4-methylpentene-1, 3-methylpentene-1,3,5,5-trimethylhexene-1, and 5-ethylnonene-1.

In one or more embodiments, aromatic-group-containing monomers containing up to 30 carbon atoms can be used. Suitable aromatic-group-containing monomers comprise at least one aromatic structure, advantageously from one to three, more advantageously a phenyl, indenyl, fluorenyl, or naphthyl moiety. The aromatic-group-containing monomer further comprises at least one polymerizable double bond such that after polymerization, the aromatic structure will be pendant from the polymer backbone. The aromatic-group containing monomer can further be substituted with one or more hydrocarbyl groups including but not limited to $C_1$ to $C_{10}$ alkyl groups. Additionally two adjacent substitutions can be joined to form a ring structure. Advantageous aromatic-group-containing monomers contain at least one aromatic structure appended to a polymerizable olefinic moiety. Particularly advantageous aromatic monomers include styrene, alpha-methylstyrene, para-alkylstyrenes, vinyltoluenes, vinylnaphthalene, allyl benzene, and indene, especially styrene, paramethyl styrene, 4-phenyl-butene-1 and allylbenzene.

In one or more embodiments, non-aromatic cyclic group containing monomers can be used. These monomers can contain up to 30 carbon atoms. Suitable non-aromatic cyclic group containing monomers advantageously have at least one polymerizable olefinic group that is either pendant on the cyclic structure or is part of the cyclic structure. The cyclic structure can also be further substituted by one or more hydrocarbyl groups such as, but not limited to, $C_1$ to $C_{10}$ alkyl groups. Advantageous non-aromatic cyclic group containing monomers include vinylcyclohexane, vinylcyclohexene, vinylnorbornene, ethylidene norbornene, cyclopentadiene, cyclopentene, cyclohexene, cyclobutene, vinyladamantad the like.

In one or more embodiments, diolefin monomer(s) can be used. Advantageous diolefin monomers include any hydrocarbon structure, advantageously $C_4$ to $C_{30}$, having at least two unsaturated bonds, wherein at least two of the unsaturated bonds are readily incorporated into a polymer by either a stereospecific or a non-stereospecific catalyst(s). It is further advantageous that the diolefin monomers be selected from alpha, omega-diene monomers (i.e. di-vinyl monomers). More advantageously, the diolefin monomers are linear divinyl monomers, most advantageously those containing from 4 to 30 carbon atoms. Examples of advantageous dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, particularly advantageous dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (weight-averaged molecular weight, Mw, less than 1000 g/mol). Advantageous cyclic dienes include cyclopentadiene, vinylnorbornene, norbornadiene, ethylidene norbornene, divinylbenzene, dicyclopentadiene or higher ring containing diolefins with or without substituents at various ring positions.

Polymer Product

In an advantageous embodiment, the process described can be used to produce homopolymers or copolymers. Advantageous polymers produced herein include homopolymers or copolymers of any of the above monomers. In an advantageous embodiment, the polymer is a homopolymer of any $C_3$ to $C_{12}$ alpha-olefin. Advantageously, the polymer is a homopolymer of propylene. In another embodiment the polymer is a copolymer comprising propylene and ethylene, and the copolymer comprises less than 60 weight % ethylene, less than 50 wt % ethylene, less than 40 weight % ethylene, or less than 30 weight % ethylene, or less than 20 weight % ethylene, or less than 10 weight % ethylene, or less than 5 weight % ethylene. In another embodiment, the polymer is a copolymer comprising propylene and one or more of any of the monomers listed above. In another embodiment, the copolymer comprises one or more diolefin comonomers, advantageously one or more $C_6$ to $C_{40}$ non-conjugated diolefins, more advantageously $C_6$ to $C_{40}$ α,ω-dienes.

In another embodiment, the polymer produced herein is a copolymer of propylene and one or more $C_2$ or $C_4$ to $C_{20}$ linear, branched or cyclic monomers, advantageously one or more $C_2$ or $C_4$ to $C_{12}$ linear, branched or cyclic alpha-olefins. Advantageously, the polymer produced herein is a copolymer of propylene and one or more of ethylene, butene, pentene, hexene, heptene, octene, nonene, decene, dodecene, 4-methyl-pentene-1,3-methyl pentene-1, and 3,5,5-trimethyl hexene 1.

In another advantageous embodiment, the polymer produced herein can be a copolymer of one or more linear or branched $C_3$ to $C_{30}$ prochiral alpha-olefins or $C_5$ to $C_{30}$ ring containing olefins or combinations thereof capable of being polymerized by either stereospecific and non-stereospecific catalysts. Prochiral, as used herein, refers to monomers that favor the formation of isotactic or syndiotactic polymer when polymerized using stereospecific catalyst(s).

In another embodiment, the polymer comprises propylene present at from 50 to 98 mol %, or 60 to 95 mol %, or 70 to 95 mol %, and a comonomer present at from 2 to 50 mol %, or 2 to 40 mol %, or 5 to 30 mol %, and a termonomer present at from 0 to 5 mol %, or from 0.5 to 5 mol %, or 1 to 3 mol %.

Catalyst Systems

Any polymerization catalyst capable of polymerizing the monomers disclosed can be used if the catalyst is sufficiently active under the polymerization conditions disclosed herein. Thus, Group-3-10 transition metals can form suitable polymerization catalysts. A suitable olefin polymerization catalyst will be able to coordinate to, or otherwise associate with, an alkenyl unsaturation. Illustrative, but not limiting, olefin polymerization catalysts include Ziegler Natta catalyst compounds, metallocene catalyst compounds, late transition metal catalyst compounds, and other non-metallocene catalyst compounds.

As disclosed herein, Ziegler-Natta catalysts are those referred to as first, second, third, fourth, and fifth generation catalysts in the Propylene Handbook, E. P. Moore, Jr., Ed., Hanser, New York, 1996. Metallocene catalysts in the same reference are described as sixth generation catalysts. One exemplary non-metallocene catalyst compound comprises nonmetallocene metal-centered, heteroaryl ligand catalyst compounds (where the metal is chosen from the Group 4, 5, 6, the lanthanide series, or the actinide series of the Periodic Table of the Elements).

Just as in the case of metallocene catalysts, these nonmetallocene metal-centered, heteroaryl ligand catalyst compounds are typically made fresh by mixing a catalyst precursor compound with one or more activators. Nonmetallocene metal-centered, heteroaryl ligand catalyst compounds are described in detail in PCT Patent Publications Nos. WO 02/38628, WO 03/040095 (pages 21 to 51), WO 03/040201 (pages 31 to 65), WO 03/040233 (pages 23 to 52), WO 03/040442 (pages 21 to 54), WO 2006/38628, and U.S. patent application Ser. No. 11/714,546, each of which is herein incorporated by reference.

Particularly useful metallocene catalyst and non-metallocene catalyst compounds are those disclosed in paragraphs [0081] to [0111] of U.S. Ser. No. 10/667,585 and paragraphs [0173] to [0293] of U.S. Ser. No. 11/177,004, the paragraphs of which are herein incorporated by reference.

The processes disclosed can employ mixtures of catalyst compounds to select the properties that are desired from the polymer. Mixed catalyst systems can be employed in the in-line blending processes to alter or select desired physical or molecular properties. For example, mixed catalyst systems can control the molecular weight distribution of isotactic polypropylene when used with the disclosure processes or for the disclosure polymers. In one embodiment of the processes disclosed herein, the polymerization reaction(s) can be conducted with two or more catalyst compounds at the same time or in series. In particular, two different catalyst compounds can be activated with the same or different activators and introduced into the polymerization system at the same or different times. These systems can also, optionally, be used with diene incorporation to facilitate long chain branching using mixed catalyst systems and high levels of vinyl terminated polymers.

The process of the present disclosure can use one or more catalysts in any of the reactors of the polymerization reactor section. Any number of catalysts can be deployed in any of the reactors of the polymerization reactor section of the present disclosure. For practical reasons, no more than five catalysts are advantageous and no more than three catalysts are more advantageous in any given reactor. The process of the present disclosure can use the same or different catalysts or catalyst mixtures in the different individual reactors of the reactor section of the present disclosure. For practical reasons, the deployment of no more than ten catalysts is advantageous and the deployment of no more than six catalysts is more advantageous in the polymerization process of the present disclosure.

The one or more catalysts deployed in the process of the present disclosure can be homogeneously dissolved in the polymerization system or can form a heterogeneous solid phase in the reactor. Operations with homogeneously dissolved catalysts are advantageous. When the catalyst is present as a solid phase in the polymerization reactor, it can be supported or unsupported. The process of the present disclosure can use any combination of homogeneous and heterogeneous catalysts simultaneously present in one or more of the individual reactors of the polymerization reactor section, i.e., any reactor of the polymerization section of the present disclosure can contain one or more homogeneous catalysts and one or more heterogeneous catalysts simultaneously.

The process of the present disclosure can use any combination of homogeneous and heterogeneous catalysts deployed in the polymerization reactor section of the present disclosure. These combinations comprise scenarios when some or all reactors use a single catalyst and scenarios when some or all reactors use more than one catalyst. One or more catalysts deployed in the process of the present disclosure can be supported on particles using fumed silica as support, which either can be dispersed in the fluid polymerization system or can be contained in a stationary catalyst bed.

When the supported catalyst particles are dispersed in the polymerization system, they can be left in the polymeric product or can be separated from the product prior to its crystallization from the fluid reactor effluent in a separation step that is downstream of the polymerization reactor section. If the catalyst particles are recovered, they either can be discarded or can be recycled with or without regeneration. The catalyst can also be supported on structured supports, such as monoliths comprising straight or tortuous channels, reactor walls, internal tubing, etc. These structured supports are well known in the art of heterogeneous catalysis.

When the catalyst(s) is (are) supported, operation with dispersed or otherwise defined particles is advantageous. When the catalyst is supported on dispersed particles, operations without catalyst recovery are advantageous, i.e., the catalyst is left in the polymeric product of the process of the present disclosure. Unsupported catalysts dissolved in the polymerization system are most advantageous. The catalyst(s) can be introduced any number of ways to the reactor. For example, the catalyst(s) can be introduced with the monomer-containing feed or separately.

In addition, the catalyst(s) can be introduced through one or multiple ports to the reactor. If multiple ports are used for introducing the catalyst(s), those ports can be placed at essentially the same or at different positions along the length of the reactor. If multiple ports are used for introducing the catalyst(s), the composition and the amount of catalyst feed through the individual ports can be the same or different. Adjustment in the amounts and types of catalyst through the different ports enables the modulation of polymer properties, such as molecular weight distribution, composition, composition distribution, crystallinity, etc.

Activators and Activation Methods for Catalyst Compounds:

The catalyst compounds described herein are combined with activators for use herein. An activator is defined as any combination of reagents that increases the rate at which a metal complex polymerizes unsaturated monomers, such as olefins. An activator can also affect the molecular weight, degree of branching, comonomer content, or other properties of the polymer.

A. Aluminoxane and Aluminum Alkyl Activators:

In one form, one or more aluminoxanes are utilized as an activator in the in-line blending processes disclosed herein. Aluminoxanes, sometimes called alumoxanes in the art, are generally oligomeric compounds containing —Al(R)—O— subunits, where R is an alkyl group. Examples of aluminoxanes include methylaluminoxane (MAO), modified methylaluminoxane (MMAO), ethylaluminoxane and isobutylaluminoxane. Alkylaluminoxanes and modified alkylaluminoxanes are suitable as catalyst activators, particularly when the abstractable ligand is a halide. Mixtures of different aluminoxanes and modified aluminoxanes can also be used. For further descriptions, see U.S. Pat. Nos. 4,665,208, 4,952,540, 5,041,584, 5,091,352, 5,206,199, 5,204,419, 4,874,734, 4,924,018, 4,908,463, 4,968,827, 5,329,032, 5,248,801, 5,235,081, 5,157,137, 25 5,103,031 and EP 0 561 476 A1, EP 0 279 586 B1, EP 0 516 476 A, EP 0 594 218 A1 and WO 94/10180.

When the activator is an aluminoxane (modified or unmodified), some embodiments select the maximum amount of activator at a 5000-fold molar excess Al/M over the catalyst compound (per metal catalytic site). The minimum activator-to-catalyst-compound is typically a 1:1 molar ratio.

B. Ionizing Activators:

It is contemplated to use an ionizing or stoichiometric activator, that is neutral or ionic, such as tri(n-butyl)ammonium tetrakis(pentafluorophenyl)-borate, a trisperfluorophenyl boron metalloid precursor or a trisperfluoro-naphtyl boron metalloid precursor, polyhalogenated heteroborane anions (WO 98/43983), boric acid (U.S. Pat. No. 5,942,459) or combination thereof as an activator herein. Also contemplated for use herein are neutral or ionic activators alone or in combination with aluminoxane or modified aluminoxane activators.

Examples of neutral stoichiometric activators include tri-substituted boron, aluminum, gallium and indium or mixtures thereof. The three substituent groups are each independently selected from alkyls, alkenyls, halogen, substituted alkyls, aryls, arylhalides, alkoxy and halides. The three groups are independently selected from halogen, mono or multicyclic (including halosubstituted) aryls, alkyls, and alkenyl compounds and mixtures thereof, advantageous are alkenyl groups having 1 to 20 carbon atoms, alkyl groups having 1 to 20 carbon atoms, alkoxy groups having 1 to 20 carbon atoms and aryl groups having 3 to 20 carbon atoms (including substituted aryls). Alternately, the three groups are alkyls having 1 to 4 carbon groups, phenyl, napthyl or mixtures thereof. Alternately, the three groups are halogenated, advantageously fluorinated, aryl groups. Alternately, the neutral stoichiometric activator is trisperfluorophenyl boron or trisperfluoronapthyl boron.

Ionic stoichiometric activator compounds can contain an active proton, or some other cation associated with, but not coordinated to, or only loosely coordinated to, the remaining ion of the ionizing compound. Such compounds and the like are described in European publications EP-A-0 570 982, EP-A-0 520 732, EP-A-0 495 375, EP-B1-0 500 944, EP-A-0 277 003 and EP-A-0 277 004, and U.S. Pat. Nos. 5,153,157, 5,198,401, 5,066,741, 5,206,197, 5,241,025, 5,384,299 and 5,502,124 and U.S. patent application Ser. No. 08/285,380, filed Aug. 3, 1994, all of which are herein fully incorporated by reference.

C. Non-Ionizing Activators:

Activators are typically strong Lewis-acids which can play either the role of ionizing or non-ionizing activator. Activators previously described as ionizing activators can also be used as non-ionizing activators.

Abstraction of formal neutral ligands can be achieved with Lewis acids that display an affinity for the formal neutral ligands. These Lewis acids are typically unsaturated or weakly coordinated. Examples of non-ionizing activators include $R^{10}(R^{11})_3$, where $R^{10}$ is a group 13 element and $R^{11}$ is a hydrogen, a hydrocarbyl, a substituted hydrocarbyl, or a functional group. Typically, $R^{11}$ is an arene or a perfluorinated arene. Non-ionizing activators also include weakly coordinated transition metal compounds such as low valent olefin complexes.

Non-limiting examples of non-ionizing activators include $BMe_3$, $BEt_3$, $B(iBu)_3$, $BPh_3$, $B(C_6F_5)_3$; $AlMe_3$, $AlEt_3$, $Al(iBu)_3$, $AlPh_3$, $B(C_6F_5)_3$, aluminoxane, CuCl, $Ni(1,5$-cyclooctadiene$)_2$.

Additional neutral Lewis-acids are known in the art and will be suitable for abstracting formal neutral ligands. See in particular the review article by E. Y.-X. Chen and T. J. Marks, "Cocatalysts for Metal-Catalyzed Olefin Polymerization: Activators, Activation Processes, and Structure-Activity Relationships", Chem. Rev., 100, 1391-1434 (2000).

Suitable non-ionizing activators include $R^{10}(R^{11})_3$, where $R^{10}$ is a group 13 element and $R^{11}$ is a hydrogen, a hydrocarbyl, a substituted hydrocarbyl, or a functional group. In one or more embodiments, $R^{11}$ is an arene or a perfluorinated arene.

Other non-ionizing activators include $B(R^{12})_3$, where $R^{12}$ is an arene or a perfluorinated arene. Illustrative activators can include ionizing and non-ionizing activators based on perfluoroaryl borane and perfluoroaryl borates such as $PhNMe_2H^+$ $B(C_6F_5)_4^-$, $(C_6H_5)_3C^+$ $B(C_6F_5)_4^-$, and $B(C_6F_5)_3$. Additional activators that can be used are described in WO 03/064433A1, which is incorporated by reference herein.

Supports

In another embodiment, the catalyst compositions of this disclosure include a support material or carrier. For example, the one or more catalyst components and/or one or more activators can be deposited on, contacted with, vaporized with, bonded to, or incorporated within, adsorbed or absorbed in, or on, one or more supports or carriers.

The support material is any of the conventional support materials. Advantageously, the supported material is a porous support material, for example, talc, inorganic oxides and inorganic chlorides. Other support materials include resinous support materials such as polystyrene, functionalized or crosslinked organic supports, such as polystyrene divinyl benzene polyolefins or polymeric compounds, zeolites, clays, or any other organic or inorganic support material and the like, or mixtures thereof.

The advantageous support materials are inorganic oxides that include those Group 2, 3, 4, 5, 13 or 14 metal oxides. The advantageous supports include silica, which can or can not be dehydrated, fumed silica, alumina (WO 99/60033), silica-alumina and mixtures thereof. Other useful supports include magnesia, titania, zirconia, magnesium chloride (U.S. Pat. No. 5,965,477), montmorillonite (European Patent EP-B1 0 511 665), phyllosilicate, zeolites, talc, clays (U.S. Pat. No. 6,034,187) and the like. In addition, combinations of these support materials can be used, for example, silica-chromium, silica-alumina, silica-titania and the like. Additional support materials can include those porous acrylic polymers described in EP 0 767 184 B1, which is incorporated herein by reference. Other support materials include nanocomposites as described in PCT WO 99/47598, aerogels as described in WO 99/48605, spherulites as described in U.S. Pat. No. 5,972,510 and polymeric beads as described in WO 99/50311, which are all herein incorporated by reference.

It is advantageous that the support material, most advantageously an inorganic oxide, has a surface area in the range of from about 10 to about 700 m$^2$/g, pore volume in the range of from about 0 to about 4.0 mL/g and average particle size in the range of from about 0.02 to about 50 μm. More advantageously, the surface area of the support material is in the range of from about 50 to about 500 m$^2$/g, pore volume of from about 0 to about 3.5 cc/g and average particle size of from about 0.02 to about 20 μm. Most advantageously the surface area of the support material is in the range is from about 100 to about 400 m$^2$/g, pore volume from about 0 to about 3.0 mL/g and average particle size is from about 0.02 to about 10 μm.

Non-porous supports can also be used as supports in the processes described herein. For example, in a advantageous embodiment the nonporous, fumed silica supports described in U.S. Pat. No. 6,590,055 can be used.

Additional useful activators for use in the processes of this disclosure include clays that have been treated with acids (such as $H_2SO_4$) and then combined with metal alkyls (such as triethylaluminum) as described in U.S. Pat. No. 6,531,552 and EP 1 160 261 A1, which is incorporated by reference herein.

Scavengers

Compounds that destroy impurities without destroying the catalyst are referred to as scavengers by one skilled in the art of polymerization. Impurities can harm catalysts by reducing their activity. Scavengers can be optionally fed to the reactor(s) of the process disclosed herein. Catalytic activity can be defined many different ways. For example, catalytic activity can be expressed as turnover frequency, i.e., the number of moles of monomers converted to the product in a unit time by one mole of catalyst. For a given reactor operating at the same residence time, catalytic activity can also be measured in terms of catalyst productivity, customarily expressed as the weight of polymer made by a unit weight of catalyst.

The scavengers for use in the processes disclosed herein can be different chemical compound(s) from the catalyst activator. Non-limiting exemplary scavengers include alkyl aluminum compounds, such as trimethyl aluminum, triethyl aluminum, tri-isobutyl aluminum, and trioctyl aluminum. The scavenger can also be the same as the catalyst activator and is generally applied in excess of what is needed to fully activate the catalyst. These scavengers include, but are not limited to, aluminoxanes, such as methyl aluminoxane. The scavenger can also be introduced to the reactor with the monomer feed or with any other feed stream. In one particular embodiment, the scavenger is introduced with the monomer-containing feed. The scavenger can be homogeneously dissolved in the polymerization polymerization system or can form a separate solid phase. In one particular embodiment, scavengers are dissolved in the polymerization system.

Solvents/Diluents

Advantageous solvents/diluents for use in the present disclosure include one or more of $C_2$-$C_{24}$ alkanes, advantageously propane, n-butane, isobutane, n-pentane, isopentane, n-hexane, mixed hexanes, isohexane, cyclopentane, cyclohexane, etc., single-ring aromatics, such as toluene and xylenes. In some advantageous embodiments, the diluent comprises one or more of methane, ethane, propane, butane, isobutane, isopentane, and hexanes. In advantageous embodiments, the solvent/diluent is recyclable.

Advantageous diluents also include $C_4$ to $C_{150}$ isoparaffins, advantageously $C_4$ to $C_{100}$ isoparaffins, advantageously $C_4$ to $C_{25}$ isoparaffins, more advantageously $C_4$ to $C_{20}$ isoparaffins. By isoparaffin is meant that the paraffin chains possess $C_1$ to $C_{10}$ alkyl branching along at least a portion of each paraffin chain. More particularly, the isoparaffins are saturated aliphatic hydrocarbons whose molecules have at least one carbon atom bonded to at least three other carbon atoms or at least one side chain (i.e., a molecule having one or more tertiary or quaternary carbon atoms), and advantageously wherein the total number of carbon atoms per molecule is in the range between 6 to 50, and between 10 and 24 in another embodiment, and from 10 to 15 in yet another embodiment. Various isomers of each carbon number will typically be present. The isoparaffins can also include cycloparaffins with branched side chains, generally as a minor component of the isoparaffin. Advantageously, the density (ASTM 4052, 15.6/15.6° C.) of these isoparaffins ranges from 0.65 to 0.83 g/cm³; the pour point is −40° C. or less, advantageously −50° C. or less, the viscosity (ASTM 445, 25° C.) is from 0.5 to 20 cSt at 25° C.; and the weight-averaged molecular weights in the range of 100 to 300 g/mol. Some suitable isoparaffins are commercially available under the trade name ISOPAR (ExxonMobil Chemical Company, Houston Tex.), and are described in, for example, U.S. Pat. Nos. 6,197,285, 3,818,105 and 3,439,088, and sold commercially as ISOPAR series of isoparaffins. Other suitable isoparaffins are also commercially available under the trade names SHELLSOL (by Shell), SOLTROL (by Chevron Phillips) and SASOL (by Sasol Limited). SHELLSOL is a product of the Royal Dutch/Shell Group of Companies, for example Shellsol™ (boiling point range=215-260° C.). SOLTROL is a product of Chevron Phillips Chemical Co. LP, for example SOLTROL 220 (boiling point=233-280° C.). SASOL is a product of Sasol Limited (Johannesburg, South Africa), for example SASOL LPA-210, SASOL-47 (boiling point=238-274° C.).

In another embodiment, advantageous diluents include $C_4$ to $C_{25}$ n-paraffins, advantageously $C_4$ to $C_{20}$ n-paraffins, advantageously $C_4$ to $C_{15}$ n-paraffins having less than 0.1%, advantageously less than 0.01% aromatics. Some suitable n-paraffins are commercially available under the trade name NORPAR (ExxonMobil Chemical Company, Houston Tex.), and are sold commercially as NORPAR series of n-paraffins. In another embodiment, advantageous diluents include dearomaticized aliphatic hydrocarbon comprising a mixture of normal paraffins, isoparaffins and cycloparaffins. Typically they are a mixture of $C_4$ to $C_{25}$ normal paraffins, isoparaffins and cycloparaffins, advantageously $C_5$ to $C_{18}$, advantageously $C_5$ to $C_{12}$. They contain very low levels of aromatic hydrocarbons, advantageously less than 0.1, advantageously less than 0.01 aromatics. Suitable dearomatized aliphatic hydrocarbons are commercially available under the trade name EXXSOL (ExxonMobil Chemical Company, Houston Tex.), and are sold commercially as EXXSOL series of dearomaticized aliphatic hydrocarbons.

In another embodiment the diluent comprises up to 20 weight % of oligomers of $C_6$ to $C_{14}$ olefins and/or oligomers of linear olefins having 6 to 14 carbon atoms, more advantageously 8 to 12 carbon atoms, more advantageously 10 carbon atoms having a kinematic viscosity of 10 or more (as measured by ASTM D 445); and advantageously having a viscosity index ("VI"), as determined by ASTM D-2270 of 100 or more.

In another embodiment, the diluent comprises up to 20 weight % of oligomers of $C_{20}$ to $C_{1500}$ paraffins, advantageously $C_{40}$ to $C_{1000}$ paraffins, advantageously $C_{50}$ to $C_{750}$ paraffins, advantageously $C_{50}$ to $C_{500}$ paraffins. In another embodiment, the diluent comprises up to 20 weight % of hydrofinished oligomers of 1-pentene, 1-hexene, 1-heptene, 1-octene, 1-nonene, 1-decene, 1-undecene and 1-dodecene. Such oligomers are commercially available as SHF and SuperSyn PAO's (ExxonMobil Chemical Company, Houston Tex.). Other useful oligomers include those sold under the trade names Synfluid™ available from ChevronPhillips Chemical Co. in Pasedena Tex., Durasyn™ available from BP Amoco Chemicals in London England, Nexbase™ available from Fortum Oil and Gas in Finland, Synton™ available from Crompton Corporation in Middlebury Conn., USA, EMERY™ available from Cognis Corporation in Ohio, USA.

In another embodiment, the diluent comprises a fluorinated hydrocarbon. Advantageous fluorocarbons for use in this disclosure include perfluorocarbons ("PFC" or "PFC's") and or hydrofluorocarbons ("HFC" or "HFC's"), collectively referred to as "fluorinated hydrocarbons" or "fluorocarbons" ("FC" or "FC's"). Fluorocarbons are defined to be compounds consisting essentially of at least one carbon atom and at least one fluorine atom, and optionally hydrogen atom(s). A perfluorocarbon is a compound consisting essentially of carbon atom and fluorine atom, and includes for example linear branched or cyclic, $C_1$ to $C_{40}$ perfluoroalkanes. A hydrofluorocarbon is a compound consisting essentially of carbon, fluorine and hydrogen. Advantageous FC's include those represented by the formula: $C_xH_yF_z$ wherein x is an integer from 1 to 40, alternatively from 1 to 30, alternatively from 1 to 20, alternatively from 1 to 10, alternatively from 1 to 6, alternatively from 2 to 20 alternatively from 3 to 10, alternatively from 3 to 6, most advantageously from 1 to 3, wherein y is an integer greater than or equal to 0 and z is an integer and at least one, more advantageously, y and z are integers and at least one. For purposes of this disclosure and the claims thereto, the terms hydrofluorocarbon and fluorocarbon do not include chlorofluorocarbons.

With regard to the polymerization system, advantageous diluents and solvents are those that are soluble in and inert to the monomer and any other polymerization components at the polymerization temperatures and pressures used.

Polymerization Process Configuration

One or more reactors in series or in parallel can be used. The catalyst compound and activator can be delivered as a solution or slurry, either separately to the reactor, activated in-line just prior to the reactor, or preactivated and pumped as an activated solution or slurry to the reactor. An advantageous operation is two solutions activated in-line. Polymerizations are carried out in either single reactor operation, in which monomer, comonomers, catalyst/activator, scavenger, and optional modifiers are added continuously to a single reactor or in series reactor operation, in which the above components are added to each of two or more reactors connected in series. The catalyst components can be added to the first reactor in the series. The catalyst component can also be added to both reactors, with one component being added to first reaction and another component to other reactors.

In one or more embodiments, polymerization can occur in high-pressure reactors where, advantageously, the reactor is substantially unreactive with the polymerization reaction components and is able to withstand the high pressures and temperatures that occur during the polymerization reaction. Such reactors are known as high-pressure reactors for purposes of this disclosure. Withstanding these high pressures and temperatures will allow the reactor to maintain the polymerization system in its homogeneous condition. Suitable reaction vessels include those known in the art to maintain high-pressure polymerization reactions. Suitable reactors are selected from autoclave, pump-around loop or autoclave, tubular, and autoclave/tubular reactors, among others.

Autoclave reactors can be operated in batch or continuous mode. To provide better productivity, and thus to lower production cost, continuous operation is advantageous in commercial operations. Tubular reactors always operate in continuous mode. Typically, autoclave reactors have length-to-diameter ratios of 1:1 to 20:1 and are fitted with a high-speed (up to 2000 RPM) multiblade stirrer. Commercial autoclave pressures are typically greater than 5 MPa with a maximum of typically less than 20 MPa. The maximum pressure of commercial autoclaves, however, can increase with advances in mechanical engineering and material science. When the autoclave has a low length-to-diameter ratio (such as less than four), the feed streams are typically injected at only one position along the length of the reactor. Reactors with large length-to-diameter ratios can have multiple injection ports at nearly the same position along the length of the reactor but radially distributed to allow for faster intermixing of the feed components with the polymerization system. In the case of stirred tank reactors, the separate introduction of the catalyst is possible and often advantageous. Such introduction prevents the possible formation of hot spots in the unstirred feed zone between the mixing point and the stirred zone of the reactor. Injections at two or more positions along the length of the reactor are also possible and sometimes advantageous. For instance, in reactors where the length-to-diameter ratio is around 4-20, the reactor advantageously can contain up to six different injection positions. Additionally, in the larger autoclaves, one or more lateral fixing devices support the high-speed stirrer. These fixing devices can also divide the autoclave into two or more zones. Mixing blades on the stirrer can differ from zone to zone to allow for a different degree of plug flow and back mixing, largely independently, in the separate zones. Two or more autoclaves with one or more zones can connect in series cascade to increase residence time or to tailor polymer structure. A series reactor cascade consists of two or more reactors connected in series, in which the effluent of at least one upstream reactor is fed to the next reactor downstream in the cascade. Besides the effluent of the upstream reactor(s), the feed of any reactor in the series cascade can be augmented with any combination of additional monomer, catalyst, or solvent fresh or recycled feed streams. Two or more reactors can also be arranged in a parallel configuration. The individual arms of such parallel arrangements are called reactor trains. These reactor trains in turn can themselves comprise one reactor or a reactor series cascade creating a combination of series and parallel reactors.

Tubular reactors are also well suited for use in this disclosure, advantageously tubular reactors capable of operating up to about 300 MPa. Advantageous tubular reactors are fitted with external cooling and one or more injection points along the (tubular) reaction zone. As in autoclaves, these injection points serve as entry points for monomers (such as propylene), one or more comonomer, catalyst, or mixtures of these. Advantageously, the flow regime in a tubular reactor is not laminar and the flow rates are high enough to exceed a Reynolds number value of 2000. When the Reynolds number exceeds 2000, the flow becomes increasingly turbulent. Typically, flows characterized by Reynolds number values of 4000 or more are completely turbulent. Flow turbulence facilitates the development of a "flat" fluid flow front with nearly identical flow rates and thus affords nearly identical residence time of reagents passing through the tube reactor. Turbulence also reduces heat transfer resistance thus affords better heat removal from and more even temperature profile in the reactor. The role of turbulence and its effects on residence time distribution, heat transfer, etc., are well known in the art of chemical engineering. In tubular reactors, external cooling allows for increased monomer conversion relative to an autoclave, where the low surface-to-volume ratio hinders any significant heat removal. Tubular reactors have a special outlet valve that can send a pressure shockwave backward along the tube. The shockwave helps dislodge any polymer residue that has formed on reactor walls during operation. Another way of addressing wall deposits is to fabricate the tube with smooth, unpolished internal surfaces. Advantageous tubular reactors can operate at pressures up to 300 MPa and advantageously have lengths of 100-4000 meters and internal diameters usually less than 12.5 cm thus sometimes have length/diameter ratios over 40,000.

Reactor trains that pair autoclaves with tubular reactors can also serve in disclosure processes. In such instances, the autoclave typically precedes the tubular reactor or the two types of reactors form separate trains of a parallel reactor configuration. Such systems can have injection of additional catalyst and/or feed components at several points in the autoclave and more particularly along the tube length.

In both autoclaves and tubular reactors, at injection, feeds are advantageously cooled to near ambient temperature or below to provide maximum cooling and thus maximum polymer production within the limits of maximum operating temperature. In autoclave operation, a preheater operates at startup, but not after the reaction reaches steady state if the first mixing zone has some back-mixing characteristics. In tubular reactors, the first section of double-jacketed tubing is heated rather than cooled and is operated continuously. A well-designed tubular reactor is characterized as plug flow. Plug flow is a flow pattern with minimal radial flow rate differences. In both multizone autoclaves and tubular reactors, catalyst can be injected at the inlet, and optionally at one or more points along the reactor. The catalyst feeds injected at the inlet and other injection points can be the same or different in terms of content, density, concentration, etc. Choosing different catalyst feeds allows polymer design tailoring.

In addition to autoclave reactors, tubular reactors, or a combination of these reactors, loop-type reactors are useful in this disclosure. In this reactor type, monomer enters and polymer exits continuously at different points along the loop, while an in-line pump continuously circulates the contents (reaction liquid). The feed/product takeoff rates control total average residence time. A cooling jacket removes reaction heat from the loop.

In general, feed inlet temperatures are generally near to or below ambient temperatures to provide cooling to the exothermic reaction in the reactor operating above the crystallization temperature of the polymer product.

The processes described herein can have residence times as short as 0.5 seconds and as long as an hour. In advantageous embodiments, the residence times are from 10 seconds to 60 minutes, advantageously from 15 seconds to 30 minutes, more advantageously from 30 seconds to 30 minutes, more advantageously from 2 minutes to 30 minutes. In some embodiments, the residence time can be selected from 10, 30, 45, 50 seconds, 1, 5, 10, 15, 20, 25, 30 and 60 minutes. Practical maximum residence times can be selected from 5, 10, 15, 30, 60 minutes. In general, disclosure processes choose residence times of from 1 minute to 60 minutes; more particularly 2 minutes to 30 minutes.

Dividing the total quantity of polymer that is collected during the reaction time by the amount of monomer added to the reaction yields the conversion rate. The monomer-to-polymer conversion rate for the described processes can be as high as 90%. For practical reasons, for example for limiting viscosity, lower conversions could be advantageous. In addition, for practical reasons, for example for limiting the cost of monomer recycle, minimum conversions could be advantageous. Thus, the process can be run at practical conversion rates of 80, 60 or less percent, 3-80, 5-80, 10-70, 15-70, 20-70, 25-60, 3-60, 5-60, 10-60, 15-60, 20-60, 10-50, 5-40-50, 15-40, 20-40, or 30-40 percent conversion, advantageously greater than 10, or greater than 20 percent conversion.

Comonomers, Dual Catalysts and Polymer Structure

In reactors with multiple injection points for catalyst and feed, there exists the possibility to tailor the polymer design. Use of more than one catalyst having different molecular weight and structural capabilities allows a wide variety of product compositions (e.g. bimodal, linear mixed with long chain branched). The various olefins will have differing reactivity ratios for a given catalyst so a plug flow operation will allow compositional tapering if for instance no feeds are injected down the reactor or compensation of the tapering if the more reactive monomer is injected preferentially along the tube. A single zone ideal back mixed autoclave reactor will not allow tapering of polymer composition but the use of multiple catalysts is still applicable. Operation of two such autoclaves in series or parallel can allow the use of tailoring by altering the composition of fresh feed to the second reactor.

When multiple reactors are used, the production of polymer blends is possible. In one embodiment, homopolymer and copolymer blends are made by using at least two reactors in parallel or series. The homopolymers could be polypropylene, polybutene, polyhexene, polyoctane, etc. In an advantageous embodiment, the homopolymer comprises polypropylene, polybutylene, polyhexene, and polystyrene. In a more advantageous embodiment, the homopolymer is polypropylene. The copolymers could be any two- or three-component combinations of ethylene, propylene, butene-1, 4-methylpentene-1, hexene-1, octene-1, styrene, norbornene, 1,5-hexadiene, and 1,7-octadiene. In a more advantageous embodiment, the copolymers are made from a two-component combination of ethylene, propylene, butene-1, hexene-1, styrene, norbornene, 1,5-hexadiene, and 1,7-octadiene. In another advantageous embodiment, the copolymer is an ethylene-propylene, propylene-butene-1, propylene-hexene-1, propylene-butene-1, ethylene-butene-1, ethylene-hexene-1, ethylene-octene-1 copolymer. When the polymer blends are made in a series reactor cascade, one or more upstream reactors are fed with a single monomer-containing feed, while the feed of one or more downstream reactors is augmented with a comonomer feed stream. Since controlling the ratio of the homo- and copolymer is difficult in a series cascade reactor configuration, parallel reactor configuration is advantageous in the production of polymer blends.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" of the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present disclosure, other and further embodiments of the disclosure can be devised without departing from the basic scope thereof, and the scope thereof is determined by the claims that follow.

What is claimed is:

1. A process for reducing reactor fouling in a homogeneous polymerization process, comprising:
   (a) providing one or more reactors with one or more feed entry ports wherein the reactors are configured in parallel, in series, or a combination thereof;
   (b) feeding to the one or more reactors through the one or more feed entry ports one or more reactor feed streams comprising: 1) an olefin monomer, 2) one or more catalyst systems, 3) optional one or more comonomers, 4) optional one or more scavengers, 5) optional one or more diluents or solvents, and 6) combinations thereof,
   wherein the one or more reactors arc at a temperature above the solid-fluid phase-transition temperature of the polymerization system and a pressure no lower than 10 MPa below the cloud point pressure of the polymerization system and less than 1500 MPa, wherein the polymerization system for each reactor is in its dense fluid state and comprises the olefin monomers, any comonomer present, any diluent or solvent present, any scavenger present, and the polymer product, wherein the catalyst system for each reactor train comprises one or more catalyst precursors, one or more activators, and optionally, one or more catalyst supports, and wherein the linear velocity of the one or more reactor feed streams passing through each of the one or more feed entry ports is greater than or equal to 0.3 m/min.

2. The process of claim 1 wherein in (b) the polymerization system for each reactor comprises less than 40 wt % of optional one or more diluents or solvents.

3. The process of claim 1 wherein in (b) the polymerization system for each reactor, is above its critical temperature and critical pressure.

4. The process of claim 1 wherein in (b) the polymerization system for each reactor comprises less than 40 wt % of optional one or more diluents or solvents and is above its critical temperature and critical pressure.

5. The process of claim 1 wherein the linear velocity of the reactor feed streams passing through each of the one or more feed entry ports is greater than or equal to 1.0 m/min.

6. The process of claim 1 wherein the linear velocity of the reactor feed streams passing through each of the one or more feed entry ports is greater than or equal to 10.0 m/min.

7. The process of claim 1 wherein one or more of the feed entry ports extend beyond the interior wall of the one or more reactors by greater than or equal to 2% the internal radius of the reactor measured at the axial position of the one or more feed entry ports.

8. The process of claim 1 wherein one or more of the feed entry ports extend beyond the interior wall of the one or more reactors by greater than or equal to 10% of the internal radius of the reactor measured at the axial position of the one or more feed entry ports.

9. The process of claim 1 wherein one or more of the feed entry ports extend beyond the interior wall of the one or more reactors by greater than or equal to 20% of the internal radius of the reactor measured at the axial position of the one or more feed entry ports.

10. The process of claim 1 wherein the one or more reactors are chosen from tank, loop, tubular, and combinations thereof.

11. The process of claim 10 wherein the one or more reactors comprise a tank with a stirrer mechanism.

12. The process of claim 11 further comprising purging the stirrer mechanism with a stirrer purge stream.

13. The process of claim 12 wherein the stirrer purge stream comprises 1) an olefin monomer, 2) optional one or more comonomers, 3) optional one or more scavengers, 4) optional one or more diluents or solvents, and 5) combinations thereof.

14. The process of claim 13 wherein the stirrer purge stream enters the reactor interior where the stirrer shaft enters the reaction zone through a stirrer feed entry port.

15. The process of claim 14 wherein the linear velocity of the stirrer purge stream passing through the stirrer feed entry port is greater than or equal to 0.3 m/min.

16. The process of claim 14 wherein the linear velocity of the stirrer purge stream passing through the stirrer feed entry port is greater than or equal to 1.0 m/min.

17. The process of claim 14 wherein the linear velocity of the stirrer purge stream passing through the stirrer feed entry port is greater than or equal to 10.0 m/min.

18. The process of claim 15 wherein the stirrer feed entry port extends beyond the interior wall of the tank reactor with a stirrer mechanism by greater than or equal to 2% of the axial length of the reactor interior.

19. The process of claim 15 wherein the stirrer feed ,entry port extends beyond the interior wall of the tank reactor with a stirrer mechanism by greater than or equal to 5% of the axial length of the reactor interior.

20. The process of claim 15 wherein the stirrer feed entry port extends beyond the interior wall of the tank reactor with a stirrer mechanism by greater than or equal to 10% of the axial length of the reactor interior.

21. The process of claim 18 wherein the tank reactor with a stirrer mechanism has length-to-diameter ratios of 1:1 to 20:1.

22. The process of claim 18 wherein the tank reactor with a stirrer mechanism includes up to six feed entry ports along its length.

23. The process of claim 18 wherein the tank reactor with a stirrer mechanism is operated in up to six zones.

24. The process of claim 1 wherein the olefin monomer of (b) comprises propylene.

25. The process of claim 1 wherein the optional one or more comonomers of (b) comprise one or more of ethylene, propylene, butenes, hexenes, octenes, decenes, or dodecenes, and combinations thereof.

26. The process of claim 1 wherein the one or more catalyst systems of (b) comprise one or more catalysts chosen from Ziegler Natta catalysts, metallocene catalysts, nonmetallocene metal-centered, heteroaryl ligand catalysts, and late transition metal catalysts.

27. The process of claim 1 wherein the one or more catalyst systems comprise one or more activators chosen from, aluminoxane activators, aluminum alkyl activators, ionizing activators, non-ionizing activators, and combinations thereof.

28. The process of claim 1 wherein in (b) the polymerization system for each reactor comprises greater than 60 wt % of optional one or more diluents or solvents.

29. The process of claim 1 wherein the one or more catalyst systems comprise one or more catalyst supports chosen from talcs, inorganic oxides, and inorganic chlorides, polystyrene, polystyrene divinyl benzene polyolefins, zeolites, clays, inorganic oxides, silica, fumed silica, alumina, silica-alumina, magnesia, titania, zirconia, magnesium chloride, montmorillonite phyllosilicate, porous acrylic polymers, nanoconaposites, spherulites, polymeric beads and combinations thereof.

30. The process of claim 1 wherein the one or more scavengers are chosen from trimethylaluminum, tricthylaluminum, triisobutylaluminum, tri-n-hexylaluminum, tri-n-octylaluminum, and combinations thereof.

31. The process of claim 10 wherein the one or more reactors comprise a tubular reactor.

32. The process of claim 31 wherein the tubular reactor has a length-to-diameter ratio of 10:1 to 50,000:1.

33. The process of claim 31 wherein the tubular reactor includes up to 10 feed entry ports along its length.

34. The process of claim 31. wherein the tubular reactor has a length of 100-4000 meters and an internal diameter of less than 12.5 cm.

35. The process of claim 31 wherein the tubular reactor is operated in multiple zones.

36. The process of claim 31 wherein the tubular reactor is operated with a Reynolds number greater than 2000.

37. The process of claim 10 wherein the one or more reactors comprise a loop reactor.

38. The process of claim 37 wherein the loop reactor has a diameter of 41 to 61 cm and a length of 100 to 200 meters.

39. The process of claim 10 wherein the one or more reactors comprise two or more reactors in series.

40. The process of claim 39 wherein, the two or more reactors in series comprise a tubular reactor followed by a stirred tank reactor.

41. The process of claim 39 wherein the two or more reactors in series comprise a tubular reactor followed by a loop reactor.

42. A process for reducing reactor fouling in a homogeneous polymerization process, comprising providing a tank, loop, or tubular reactor with one or more feed entry ports, and feeding to the reactor feed streams comprising: 1) an olefin monomer, 2) one or more catalyst systems, 3) optional one or more comonomers, 4) optional one or more scavengers, 5) optional one or more diluents or solvents, and 6) combinations thereof, wherein the linear velocity of the reactor feed streams passing through each of the one or more feed entry ports is greater than or equal to 0.3 m/min.

43. The process of claim 42 wherein the linear velocity of the reactor feed streams passing through each of the one or more feed entry ports is greater than or equal to 1.0 m/min.

44. The process of claim 42 wherein the linear velocity of the reactor feed streams passing through each of the one or more feed entry ports is greater than or equal to 10.0 m/min.

45. The process of claim 42 wherein one or more of the feed entry ports extend beyond the interior wall of the reactor by greater than or equal to 2% of the internal radius of the reactor measured at the axial position of the one or more feed entry ports.

46. The process of claim 42 wherein one or more of the feed entry ports extend beyond the interior wall of the reactor by greater than or equal to 10% of the internal radius of the reactor measured at the axial position of the one or more feed entry ports.

47. The process of claim 42 wherein one or more of the feed entry ports extend beyond the interior wall of the reactor by greater than or equal to 20% of the internal radius of the reactor measured at the axial position of the one or more feed entry ports.

48. the process of claim 42 wherein the tank reactor includes a stirrer mechanism.

49. The process of claim 48 wherein the stirrer mechanism further includes a stirrer feed entry port that enters the reactor interior where the stirrer shall enters the reaction zone for feeding a stirrer purge stream.

50. The process of claim 49 wherein the stirrer purge stream comprises: 1) an olefin monomer, 2) optional one or more comonomers, 3) optional one or more scavengers, 4) optional one or more diluents or solvents, and 5) combinations thereof.

51. The process of claim 50 wherein the linear velocity of the stirrer purge stream is greater than or equal to 0.3 m/min.

52. The process of claim 50 wherein the linear velocity of the stirrer purge stream is greater than or equal to 1.0 m/min.

53. The process of claim 50 wherein the linear velocity of the stirrer purge stream is greater than or equal to 10.0 m/min.

54. The process of claim 51 wherein the stirrer feed entry port extends beyond the interior wall of the reactor by greater than or equal to 2% of the axial length of the reactor interior.

55. The process of claim 51 wherein the stirrer feed entry port extends beyond the interior wall of the reactor by greater than or equal to 5% of the axial length of the reactor interior, 56. The process of claim 51 wherein the stirrer feed entry port extends beyond the interior wall of the reactor by greater than or equal to 10% of the axial length of the reactor interior.

* * * * *